(12) United States Patent
Tang et al.

(10) Patent No.: US 12,477,751 B2
(45) Date of Patent: Nov. 18, 2025

(54) SRAM DEVICE AND 3D SEMICONDUCTOR INTEGRATED CIRCUIT THEREOF

(71) Applicant: SAMSUNG ELECTRONICS CO., LTD., Suwon-si (KR)

(72) Inventors: Ho Young Tang, Suwon-si (KR); Tae-Hyung Kim, Suwon-si (KR); Dae Young Moon, Suwon-si (KR); Sang-Yeop Baeck, Suwon-si (KR); Dong-Wook Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 351 days.

(21) Appl. No.: 18/126,761

(22) Filed: Mar. 27, 2023

(65) Prior Publication Data
US 2023/0337443 A1    Oct. 19, 2023

(30) Foreign Application Priority Data

Apr. 14, 2022 (KR) .................. 10-2022-0046081
Aug. 12, 2022 (KR) .................. 10-2022-0101454

(51) Int. Cl.
*H10B 80/00* (2023.01)
*H10B 10/00* (2023.01)

(52) U.S. Cl.
CPC ............ *H10B 80/00* (2023.02); *H10B 10/18* (2023.02)

(58) Field of Classification Search
CPC ................... H10B 80/00; H10B 10/18
See application file for complete search history.

(56) References Cited

U.S. PATENT DOCUMENTS

| | | | |
|---|---|---|---|
| 8,243,487 B2 | 8/2012 | Kang et al. | |
| 9,236,295 B2* | 1/2016 | Yoon | H01L 21/76877 |
| 10,311,191 B2 | 6/2019 | Wuu et al. | |
| 11,080,455 B1 | 8/2021 | Hu et al. | |
| 12,308,087 B2* | 5/2025 | Lee | G11C 7/1057 |
| 2018/0053545 A1* | 2/2018 | Son | G11C 7/08 |
| 2021/0313345 A1* | 10/2021 | Or-Bach | H10B 41/35 |

(Continued)

FOREIGN PATENT DOCUMENTS

| | | |
|---|---|---|
| KR | 10-2011-0131976 A | 12/2011 |
| KR | 10-2020-0000917 A | 1/2020 |
| KR | 10-2022-0015599 A | 2/2022 |

*Primary Examiner* — Mamadou L Diallo
(74) *Attorney, Agent, or Firm* — Sughrue Mion, PLLC

(57) ABSTRACT

Provided are a three-dimensional (3D) semiconductor integrated circuit and a static random access memory (SRAM) device. The three-dimensional (3D) semiconductor integrated circuit includes: a first die including a power supply circuit a second die including an SRAM with a through-silicon-via (TSV) bundle region; a third die including a processor; and TSVs, each of which is provided on the TSV bundle region and extends from the TSV bundle region to the third die. The SRAM device includes: a bank array with banks, each of which includes sub-bit-cell arrays and a local peripheral circuit region arranged in a cross (+) shape between the sub-bit-cell arrays; and a global peripheral circuit region including a tail peripheral circuit region extending in a first direction and a head peripheral circuit region extending in a second direction, the tail peripheral circuit region and the head peripheral circuit region being arranged in a "T" shape.

20 Claims, 15 Drawing Sheets

(56) References Cited

U.S. PATENT DOCUMENTS

| | | | |
|---|---|---|---|
| 2022/0137843 A1* | 5/2022 | Vogelsang | G06F 3/0673 |
| | | | 711/106 |
| 2022/0261363 A1* | 8/2022 | Confalonieri | G06F 13/1694 |
| 2023/0005816 A1* | 1/2023 | Simsek-Ege | H10B 12/315 |
| 2023/0095330 A1* | 3/2023 | Lee | G11C 11/419 |
| | | | 365/154 |
| 2023/0380136 A1* | 11/2023 | Liu | H10B 12/50 |
| 2023/0402098 A1* | 12/2023 | Or-Bach | H10B 43/10 |
| 2024/0389366 A1* | 11/2024 | Or-Bach | H01L 24/08 |

\* cited by examiner

SRAM DEVICE AND 3D SEMICONDUCTOR INTEGRATED CIRCUIT THEREOF

CROSS-REFERENCE TO RELATED APPLICATION

This application claims priority from Korean Patent Application No. 10-2022-0046081, filed on Apr. 14, 2022, in the Korean Intellectual Property Office, and Korean Patent Application No. 10-2022-0101454, filed on Aug. 12, 2022, in the Korean Intellectual Property Office, the disclosures of which are incorporated by reference herein in their entireties.

BACKGROUND

1. Field

The present disclosure relates to a memory device and a three-dimensional (3D) semiconductor integrated circuit including the same.

2. Description of Related Art

Due to the demand for high integration and the advance of semiconductor processes, semiconductor chips integration density increases as the size of integrated components is reduced. For example, widths, intervals, and/or heights of wiring lines included in integrated circuits may decrease, causing parasitic elements of the wiring lines to increase. In addition, power supply voltages of integrated circuits may be reduced for educed power consumption, high operation speed, and the like, and thus, parasitic elements of wiring lines may have more significant influences or impacts on the integrated circuits.

For example, static random access memory (SRAM) may be used in integrated circuits. As products are diversified, it is important for semiconductor integrated circuits, particularly semiconductor integrated circuits including SRAM, to balance power consumption with operating speed. Despite parasitic elements, semiconductor integrated circuits, which include SRAM, may be required to stably provide high performance according to requirements of various applications.

SUMMARY

One or more embodiments provide a three-dimensional (3D) semiconductor integrated circuit in which a through-silicon-via (TSV) is included in a bit-cell array.

One or more embodiments provide a 3D semiconductor integrated circuit in which power is stably supplied through a TSV.

Aspects of the present disclosure are not restricted to those set forth herein. The above and other aspects of the present disclosure will become more apparent to one of ordinary skill in the art to which the present disclosure pertains by referencing the detailed description of the present disclosure given below.

According to an example embodiment, a 3D semiconductor integrated circuit includes: a first die including a circuit configured to supply a power voltage; a second die including a static random access memory (SRAM) device including a through-silicon-via (TSV) bundle region; a third die including a processor; and a plurality of TSVs, each of which is provided on the TSV bundle region and extends from the TSV bundle region to the third die. The SRAM device includes: a bank array including a plurality of banks, each of which includes a plurality of sub-bit-cell arrays and a local peripheral circuit region arranged in a cross (+) shape between the plurality of sub-bit-cell arrays; and a global peripheral circuit region including a tail peripheral circuit region extending in a first direction and a head peripheral circuit region extending in a second direction, the tail peripheral circuit region and the head peripheral circuit region being arranged in a "T" shape.

According to an aspect of an example embodiment, an SRAM device includes: a bank array including a plurality of banks, each of which includes a plurality of sub-bit-cell arrays and a local peripheral circuit region arranged in a cross (+) shape between the plurality of sub-bit-cell arrays; a global peripheral circuit including a global decoder circuit extending in a first direction between the plurality of banks, and a global input/output circuit extending in a second direction on one side of the bank array; a plurality of through-silicon-vias (TSVs) and arranged in a line; and a plurality of metal lines extending in the first direction to connect the global input/output circuit to a local input/output circuit of the local peripheral circuit region. The plurality of metal lines are disposed to cross between back-end-of-line (BEOL) keep-out zones of two adjacent TSVs among the plurality of TSVs.

According to an example embodiment, an SRAM device includes: a bank array including a plurality of banks, each of which includes a plurality of sub-bit-cell arrays and a local peripheral circuit region configured to access the plurality of sub-bit-cell arrays; a global peripheral circuit including a global decoder extending in a first direction between the plurality of banks and a global input/output circuit that extends in a second direction on one side of the bank array; a plurality of through-silicon-vias (TSVs) provided in a TSV bundle region and configured to supply a power voltage to another die; a plurality of back-end-of-line (BEOL) keep-out zones surrounding the TSVs and facing a first side of the bank array; and a plurality of metal lines extending in the first direction to electrically connect the global input/output circuit to a local input/output circuit of the local peripheral circuit region. The metal lines cross between adjacent BEOL keep-out zones.

It should be noted that the effects of the present disclosure are not limited to those described above, and other effects of the present disclosure will be apparent from the following description.

BRIEF DESCRIPTION OF DRAWINGS

The above and other aspects and features will be more apparent from the following description of embodiments, taken in conjunction with the accompanying drawings, in which.

DETAILED DESCRIPTION

Hereinafter, embodiments will be described with reference to the attached drawings. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Terms such as "one side" and "other side" may be used in a relative sense herein to facilitate easier understanding of the inventive concepts. Accordingly, "one side," and "other side" may not refer to any specific direction, location, or component, and may be used interchangeably. For example, "one side" may be interpreted as "other side" and vice versa. Also, "one side" may be expressed as "first side," and "other side" may be expressed as "second side," and vice versa. However, "one side" and "other side" cannot be used interchangeably in the same embodiment. The term "both sides" as used herein refers to both one side and the other side.

The terms "one side," "other side," or "both sides" are used herein to refer to a boundary line of a component in a plan view of a layout of an integrated circuit.

Terms such as "first direction" and "second direction" may be used in a relative sense herein to facilitate easier understanding of the inventive concepts. Accordingly, "first direction," and "second direction" may not refer to any specific direction, and may be used interchangeably. In the following embodiments, "first direction" is expressed as "Y-direction," and "second direction" is expressed "X-direction". However, X direction may be expressed as a first direction, and Y-direction may be expressed as a second direction. However, "first direction" and "second side" cannot be used interchangeably in the same embodiment.

Figure 1:
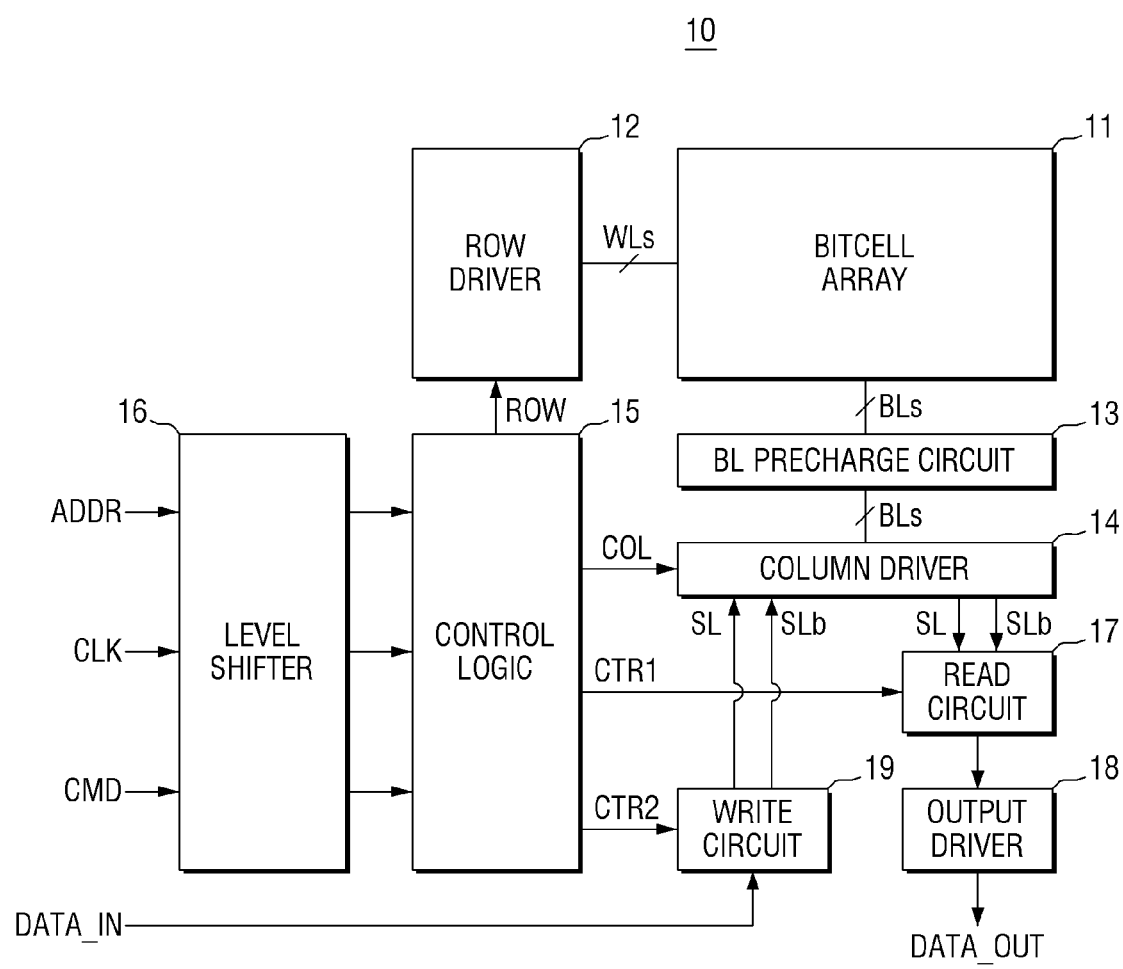
FIG. 1 is a block diagram illustrating a memory device according to some embodiments.

FIG. 1 is a block diagram illustrating a memory device according to some embodiments. A memory device 10 may be a standalone memory device or an embedded memory device according to some embodiments. The memory device 10 may include components configured to write data or read data from the memory device 10.

Referring to FIG. 1, the memory device 10 may include a bit-cell array 11, a row driver 12, a bit line precharge circuit 13, a column driver 14, a control logic 15, a level shifter 16, a read circuit 17, an output driver 18 and a write circuit 19. The memory device 10 may further include an address buffer, a data buffer, a data input/output circuit, an internal voltage generator circuit, a pulse generator circuit, and the like.

The memory device 10 may receive a command CMD, an address ADDR, a clock CLK, and write data DATA_IN, and output read data DATA_OUT. For example, the memory device 10 may receive a write command CMD, an address (which may be referred to as a write address), and write data DATA_IN, and store write data DATA_IN in a region of a bit-cell array that corresponds to the address. Also, the memory device 10 may receive a read command CMD and an address (which may be referred to as a read address), and may output read data DATA_OUT to the outside, which is stored in a region of the bit-cell array 11 that corresponds to the address.

The bit-cell array 11 may include a plurality of bit cells each of which is accessed by a word line and a bit line. The bit cells included in the bit-cell array 11 may be volatile bit cells such as static random access memory (SRAM) or dynamic random access memory (DRAM). In embodiments, SRAM bit cells will be mainly described, but embodiments are not limited thereto.

The bit-cell array 11 may include a plurality of bit cells. Each of the plurality of bit cells may be connected to at least one of a plurality of word lines WLs and at least one of a plurality of bit lines BLs.

The row driver 12 may be connected to the bit-cell array 11 through the plurality of word lines WLs. The row driver 12 may activate one word line among the plurality of word lines WLs based on a row address ROW. Accordingly, bit cells connected to the activated word line among the plurality of bit cells may be selected. In this regard, the row driver 12 may select any one of the plurality of word lines WLs.

The bit line precharge circuit 13 may be connected to the bit-cell array 11 through the plurality of bit lines BLs. The bit line precharge circuit 13 may precharge the plurality of bit lines BLs. The plurality of bit lines BLs may include a bit line (or bitline) and a bit line bar (or bitline bar) connected to opposite ends of the bit cell.

The column driver 14 may be connected to the bit line precharge circuit 13 through a plurality of bit lines BLs. The column driver 14 may select at least one bit line from among the plurality of bit lines BLs based on a column address COL. As at least one bit line is selected from among the plurality of bit lines BLs, bit cells connected to the selected bit line may be selected from among the plurality of bit cells. At least one bit line may include a first bit line SL and a first bit line bar SLb. The first bit line SL and the first bit line bar SLb may be connected to opposite ends of the bit-cell array 11.

The control logic 15 may receive a command CMD, an address ADDR, and a clock CLK, and may generate a row address ROW, a column address COL, a first control signal CTR1, and a second control signal CTR2. For example, the control logic 15 may identify a read command by decoding the command CMD, and may generate a row address ROW, a column address COL, and the first control signal CTR1 to read data DATA_OUT from the bit-cell array 11. Also, the control logic 15 may identify a write command by decoding the command CMD, and may generate a row address ROW, a column address COL, and the second control signal CTR2 to write data DATA_IN to the bit-cell array 11. The first control signal CTR1 may be referred to as a "sensing enable signal," and the second control signal CTR2 may be referred to as a "write pulse". The control logic 15 may generate a write pulse based on a write enable signal included in the command CMD and a pulse signal generated in the control logic 15.

The level shifter 16 may receive a command CMD, an address ADDR, and a clock CLK, shift the voltage levels of the command CMD, the address ADDR and the clock CLK, and transmit the voltages to the control logic 15. In this regard, the level shifter 16 may be used to shift input signals having a relatively low voltage to output signals having a relatively high voltage. For example, to operate a dual rail SRAM with low power, the control logic 15 may be operated based on a low voltage.

By sensing a current and/or voltage received through the plurality of bit lines BLs at the time of performing a read operation, the read circuit 17 may identify values stored in the memory cells connected to the activated word line (i.e., selected memory cells) and output the read data DATA_OUT based on the identified values. The read circuit 17 may be connected to the column driver 14 through at least one of the plurality of bit lines BLs. The at least one bit line may include the first bit line SL and a second bit line SLb complementary to the first bit line SL. The read circuit 17 may include a sense amplifier. The read circuit 17 may receive the first control signal CTR1 from the control logic 15. The read circuit 17 may sense a voltage difference between the first bit line SL and the second bit line SLb, and amplify the sensed voltage difference.

The output driver 18 may receive amplified signals from the read circuit 17 and output the read data DATA_OUT to the outside of the memory device 10.

The write circuit 19 may apply a current and/or voltage to the plurality of bit lines BLs based on the write data DATA_IN at the time of performing a write operation, and write values to the memory cells connected to the activated word line, i.e., selected memory cells. The write circuit 19 may be connected to the column driver 14 through at least one of the plurality of bit lines BLs. The at least one bit line may include the first bit line SL and the second bit line SLb. At least one bit line may include a first bit line SL and a first bit line bar SLb.

Figure 2:
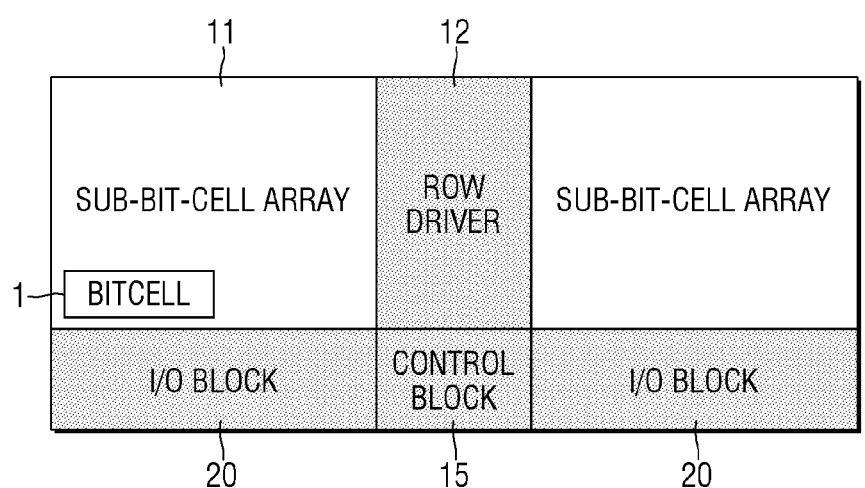
FIGS. 2 and 3 are block diagrams conceptually illustrating bank arrays including bit-cell arrays according to some embodiments.
Figure 3:
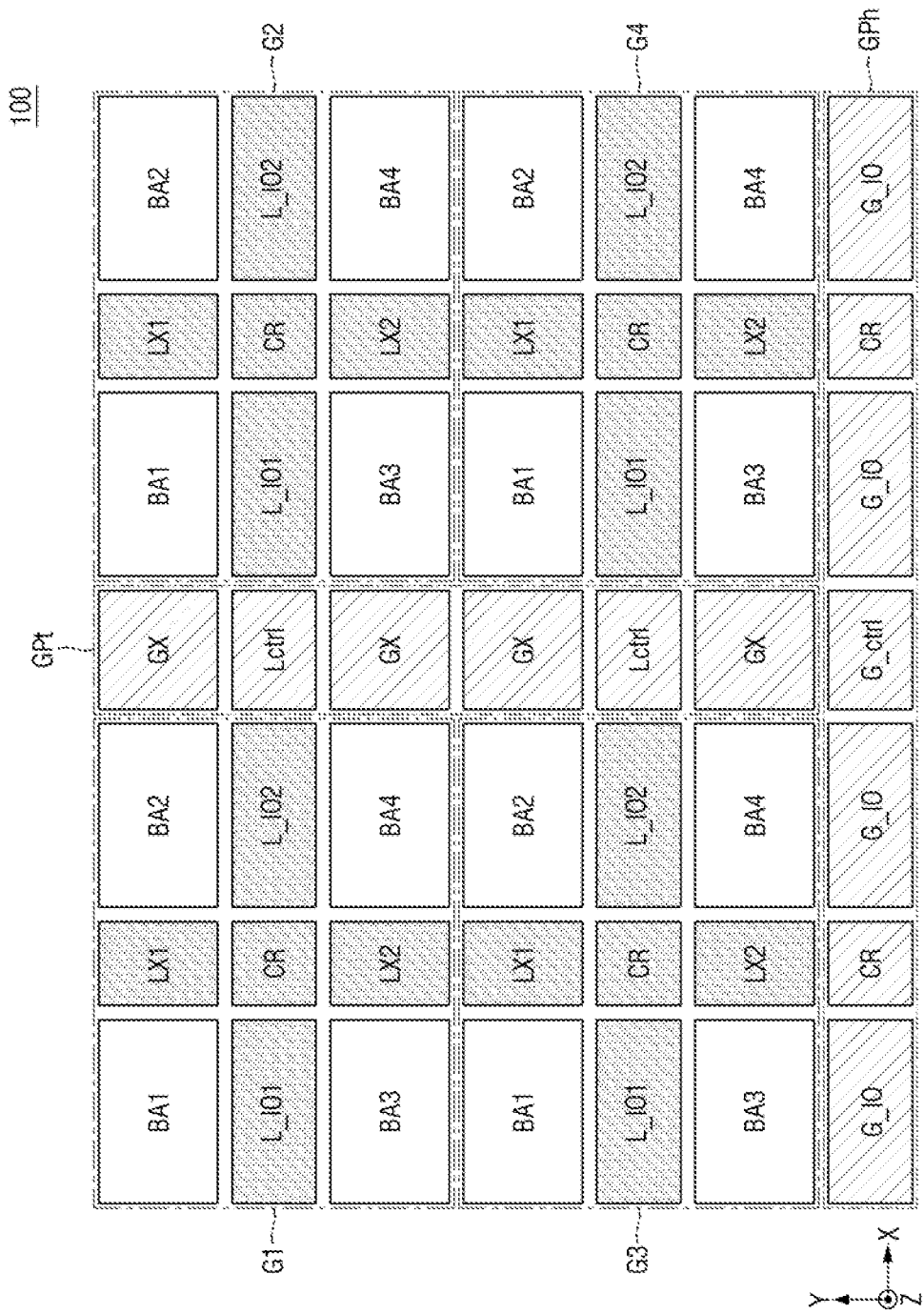

FIGS. 2 and 3 are block diagrams conceptually illustrating bank arrays according to some embodiments.

The bit-cell array 11 of FIG. 1 may be arranged as a bank array 100 according to some embodiments.

In the bank array 100, bit-cell arrays BA are arranged in bank units. One bank unit may include a plurality of sub-bit-cell arrays activated by the same chip select signal ChipSelect. For example, bit cells of the sub-bit-cell array are each accessed by the row driver and the input/output circuit activated by the same chip select signal ChipSelect.

The bank array may include one bank. For example, the bit-cell array 11 of FIG. 1 may be arranged in the bank array 100 as shown in FIG. 2 according to some embodiments. FIG. 2 illustrates an example of a one-bank array. As shown, the one bank array includes two sub-bit-cell arrays, and may include peripheral circuits 12, 15, and 20 for accessing the sub-bit-cell arrays.

The bank array may include a plurality of banks. For example, the bit-cell array 11 of FIG. 1 may be arranged in a bank array 100 as shown in FIG. 3 according to some embodiments. FIG. 3 illustrates an example of a four-bank array, but embodiments are not limited to this example.

In the illustrated example, the bank array 100 may include a first bank G1, a second bank G2, a third bank G3, and a fourth bank G4, and may further include global peripheral circuits GPh and GPt for accessing the first to fourth banks G1, G2, G3, and G4.

The global peripheral circuits may include a first global peripheral circuit region GPt including a plurality of global row decoders GX arranged to extend in a first direction Y in a plan view, and a second global peripheral circuit region GPh including a plurality of global input/output circuits G_IO arranged to extend in a second direction X in a plan view. For example, the first global peripheral circuit region GPt and the second global peripheral circuit region GPh may be arranged in an inverted "T" shape. The first global peripheral circuit region GPt may be referred to as a tail peripheral circuit region, and the second global peripheral circuit region GPh may be referred to as a head peripheral region. However, it will be apparent that embodiments are not limited to these names.

In the bank array 100, two banks are disposed on each of the left and right side of the tail peripheral circuit GPt. For example, the first bank G1 and the third bank G3 may be arranged in a line in the first direction Y on one side (left side in the illustrated example) of the tail peripheral circuit region Gpt, respectively. The second bank G2 and the fourth bank G4 may be arranged in a line in the first direction Y on the other side (right side in the illustrated example) of the tail peripheral circuit region Gpt, respectively. The first bank G1 and the second bank G2 may be disposed in the same row in the second direction X, and the third bank G4 and the fourth bank G4 may be disposed in the same row in the second direction X.

Each of the banks G1, G2, G3, and G4 may include a plurality of sub-bit-cell arrays, a local decoder, and a local input/output circuit.

For example, the first bank G1 may include a local peripheral circuit region in which four sub-bit-cell arrays BA1, BA2, BA3, and BA4 and a local peripheral circuit region are disposed in a cross (+) shape between the sub-bit-cell arrays, and the local peripheral circuit region may include local decoders LX1 and LX2 and local input/output circuits L_IO1 and L_IO2.

For example, the sub-bit-cell array BA1 may be disposed on one side (e.g., the left side) of the local decoder LX1 and the sub-bit-cell array BA2 may be disposed on the other side (e.g., the right side) of the local decoder LX1, so that they may be electrically connected to the local decoder LX1. The sub-bit-cell array BA3 may be disposed on one side (e.g., the left side) of the local decoder LX2 and the sub-bit-cell array BA4 may be disposed on the other side (e.g., the right side) of the local decoder LX2, so that they may be electrically connected to the local decoder LX1. In addition, the sub-bit-cell array BA1 may be disposed on one side of the local input/output circuit L_IO1 in the first direction and the sub-bit-cell array BA3 may be disposed on the other side of the local input/output circuit L_IO1 in the first direction.

In this regard, the sub-bit-cell array BA1, the local decoder LX1, the sub-bit-cell array BA2 and the global decoder GX of the first bank G1, and the sub-bit-cell array BA1, the local decoder LX1 and the sub-bit-cell array BA2 of the second bank G2 may be arranged in a line in the second direction X. Also, the sub-bit-cell array BA3, the local decoder LX2, the sub-bit-cell array BA4 and the global decoder GX of the first bank G1, and the sub-bit-cell array BA3, the local decoder LX2 and the sub-bit-cell array BA4 of the second bank G2 may be arranged in a line in the second direction X.

A conversion region CR may be disposed between the local input/output circuit L_IO1 and the local input/output circuit L_IO2. According to some embodiments, a peripheral circuit or logic circuit used to access the first bank G1 may be disposed in the conversion region CR.

A portion of a local control logic Lctrl may be disposed between the local input/output circuits L_IO1 and L_IO2 of the first bank G1 and the local input/output circuits L_IO1 and L_IO2 of the second bank G2. The local control logic Lctrl is a part of the control logic 15 of FIG. 1, and may include a circuit for controlling the local decoders LX and the local input/output circuits L_IO1 and L_IO2 included in the banks.

The tail peripheral circuit region GPt is disposed between the first bank G1 and the second bank G2 and between the third bank G3 and the fourth bank G4. The global row decoder GX disposed in the same row as the first bank G1 and the second bank G2 may be connected to the local decoders LX of the first bank G1 and the second bank G2, and the global row decoder GX disposed in the same row as the third bank G3 and the fourth bank G4 may be connected to the local decoders LX of the third bank G3 and the fourth bank G4.

The head peripheral circuit region GPh is disposed on one side of the first bank G1 and the third bank G3, and on one side of the second bank G2 and the fourth bank G4. One of the plurality of global input/output circuits G_IO is disposed in the same column as the sub-bit-cell arrays BA1 and BA3 and the local input/output circuit L_IO1 of the first bank G1 and the sub-bit-cell arrays BA1 and B3 and the local input/output circuit L_IO1 of the third bank G3. One of the plurality of global input/output circuits G_IO is disposed in the same column as the sub-bit-cell arrays BA2 and BA4 and the local input/output circuit L_IO2 of the first bank G1 and the sub-bit-cell arrays BA2 and B4 and the local input/output circuit L_IO2 of the third bank G3. One of the plurality of global input/output circuits G_IO is disposed in the same column as the sub-bit-cell arrays BA1 and BA3 and the local input/output circuit L_IO1 of the second bank G2 and the sub-bit-cell arrays BA1 and B3 and the local input/output circuit L_IO1 of the fourth bank G4. One of the plurality of global input/output circuits G_IO is disposed in the same column as the sub-bit-cell arrays BA2 and BA4 and the local input/output circuit L_IO2 of the second bank G2 and the sub-bit-cell arrays BA2 and B4 and the local input/output circuit L_IO2 of the fourth bank G4.

For example, the global input/output circuit G_IO that is disposed in the same column as the sub-bit-cell arrays BA1 and BA3 and the local input/output circuit L_IO1 of the first bank G1 and the sub-bit-cell arrays BA1 and B3 and the local input/output circuit L_IO1 of the third bank G3 is electrically connected to the local input/output circuit L_IO1 of the first bank G1 or the local input/output circuit L_IO1 of the third bank G3 to read or write data from or to at least one bit cell belonging to the first bank G1 or the third bank G3. Similarly, the remaining global input/output circuits G_IO are electrically connected, respectively, to the local input/output circuit L_IO2 of the first bank G1 or the local input/output circuit L_IO2 of the third bank G3, the local input/output circuit L_IO1 of the second bank G2 or the local input/output circuit L_IO1 of the fourth bank G4, and the local input/output circuit L_IO2 of the second bank G2 or the local input/output circuit L_IO2 of the fourth bank G4 to read or write data from or to the corresponding bit cell.

Figure 4:
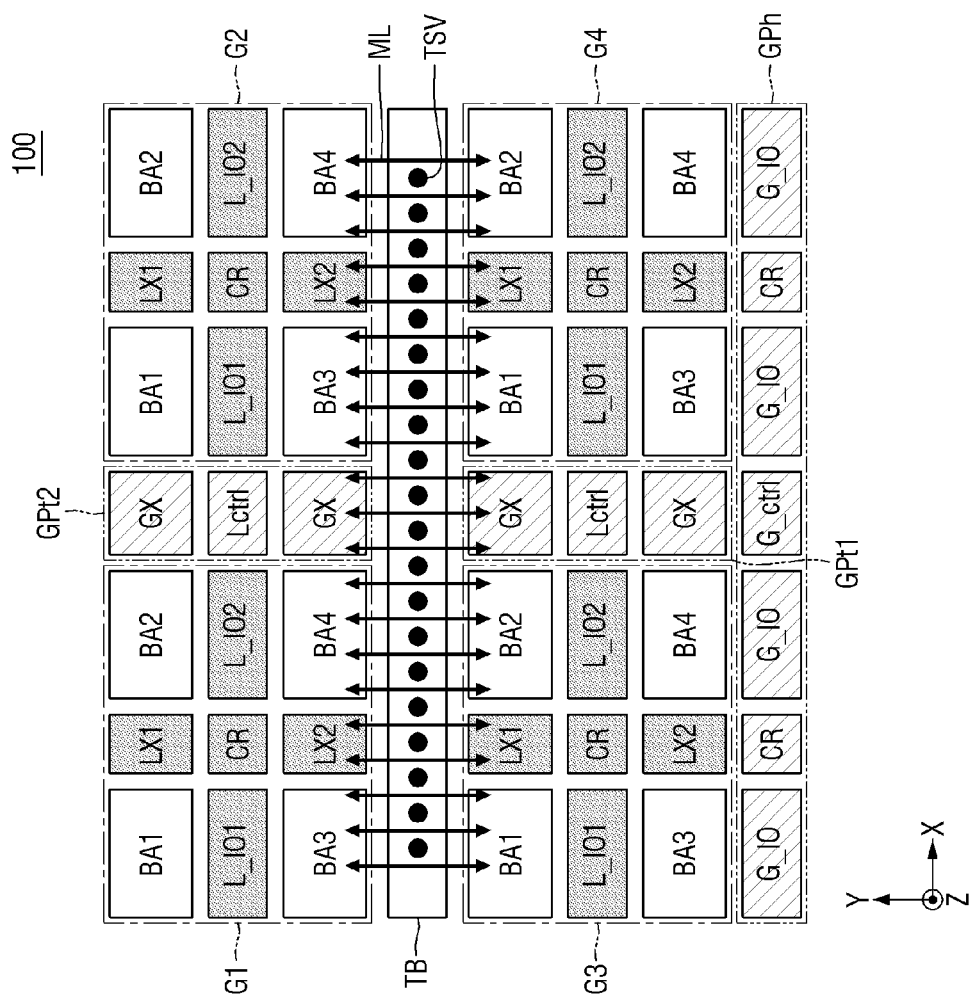
FIG. 4 is a block diagram illustrating a bit-cell array including a through-silicon-via (TSV) bundle region according to some embodiments.

FIG. 4 is a block diagram illustrating a bit-cell array including a through-silicon-via (TSV) bundle region according to some embodiments. Any redundant description of the bit-cell array regarding FIG. 3 will be omitted.

A TSV bundle region TB may be disposed between bank rows having a relatively low wiring density in a bit-cell array. For example, referring to FIG. 4, the TSV bundle region TB may be disposed between bank rows extending in the second direction X. The TSV bundle region TB may be disposed parallel to the bank rows in the second direction X. Also, the TSV bundle region TB may be disposed parallel to a head peripheral circuit region GPh.

In this regard, the TSV bundle region TB may be disposed between a first bank G1 and a third bank G3 arranged in the first direction Y, between a first tail peripheral circuit region GPt1 and a second tail peripheral circuit region GPt2, and between a second bank G2 and a fourth bank G4.

The TSV bundle region TB includes a plurality of through-silicon-vias (TSVs).

Local control circuits Lctrl, local input/output circuits L_IO1 and L_IO2, and local decoders LX1 and LX2 in the banks are connected to a global control circuit G ctrl, global input/output circuits G_IO, and global row decoders GX through a plurality of metal lines.

The global row decoders GX and the local decoders LX may be connected to a plurality of metal lines extending in the second direction X.

The global input/output circuit G_IO and the local input/output circuits L_IO1 and L_IO2 may be connected to each other by a plurality of metal lines ML extending in the first direction Y.

The metal lines ML extending in the first direction Y are disposed to cross the TSV bundling region TB. Specifically, the metal lines ML extending in the first direction Y are disposed to pass (i.e., cross) between the TSVs of the TSV bundle region TB.

When the TSV bundle region through which the metal lines can pass is disposed in the memory cell array region, the area of the bit-cell array may be increased, and size of a memory device can be reduced.

Figure 5:
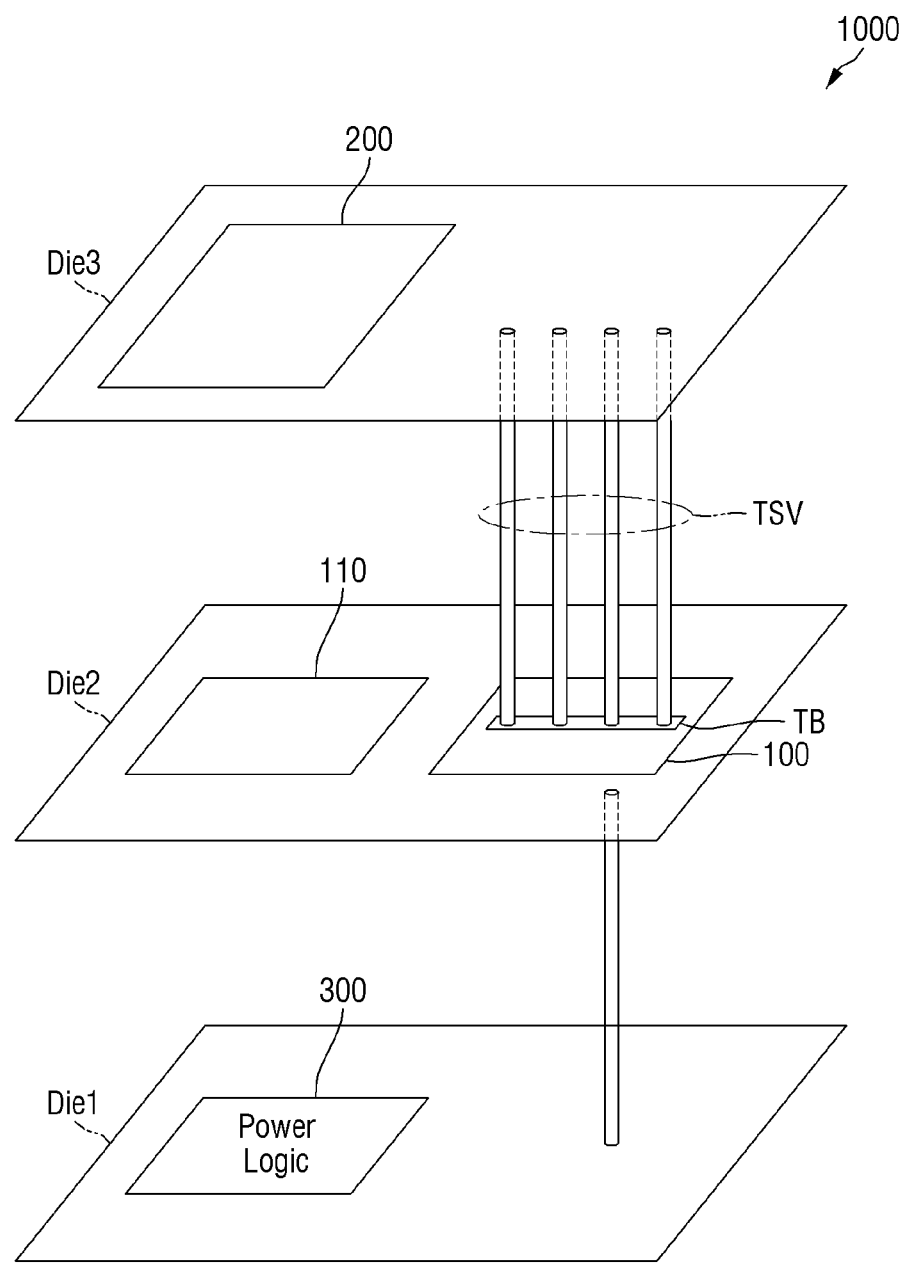
FIG. 5 is a schematic diagram of a semiconductor integrated circuit according to some embodiments.

FIG. 5 is a schematic diagram of a semiconductor integrated circuit according to some embodiments.

Referring to FIGS. 4 and 5, a semiconductor integrated circuit 1000 may include at least three stacked dies. For example, the semiconductor integrated circuit 1000 may be implemented such that a first die Die1, a second die Die2, and a third die Die3 are sequentially stacked on one another. The first die Die1, the second die Die2, and the third die Die3 may be disposed parallel to a substrate.

The first die Die1 may include a power logic circuit 300 that supplies a power voltage or a power current. The first die Die1 may be disposed on a semiconductor package substrate.

The second die Die2 is an intermediate die between the first die Die1 and the third die Die3, and may include a semiconductor chip 110 and an SRAM device including a bank array 100. The bank array 100 may be the bank array described with reference to FIGS. 1 to 4 according to some embodiments. The bank array 100 may include a TSV bundle region TB, and the TSV bundle region TB may include a plurality of TSVs that penetrate the second die Die2 to connect the first die Die1 to the third die Die3. The TSVs of the second die Die2 may provide a signal provided from the first die Die1 to the third die Die3. According to some embodiments, a number of TSVs (hereinafter referred to as "lower TSVs") used to connect the first die Die1 to the second die Die2 may be different from a number of TSVs (hereinafter referred to as "upper TSVs") used to connect the second die Die2 to the third die Die3. In this case, the lower TSVs and the upper TSVs may be disposed in each of the dies to vertically penetrate each die at the same point and be connected to each other, or may be disposed to vertically penetrate each die at different points and be electrically connected to each other through different metal lines parallel to each die.

A signal provided by the TSVs between the dies may include a signal generated by a power logic circuit 300, for example, a power voltage, a power current, a control signal, or the like. In this regard, the TSV may be a vertical die-to-die signal path. The semiconductor chip 110 may be a processor configured to perform a complicated arithmetic operation or the like. The semiconductor chip 110 may store intermediate values, result values, and the like obtained from the processing operation in the bank array 100, which may be provided in an SRAM device.

The third die Die3 may include a semiconductor chip 200. The semiconductor chip 200 may be a processor configured to perform an arithmetic operation or the like, or may be an intellectual property (IP) circuit configured to perform a predetermined function. The semiconductor chip 200 may operate based on signals provided through the TSVs. For example, the semiconductor chip 200 may operate with a power voltage and/or power current provided through the TSV, or the operation of the semiconductor chip 200 may be controlled based on a control signal provided through the TSV.

Figure 6A:
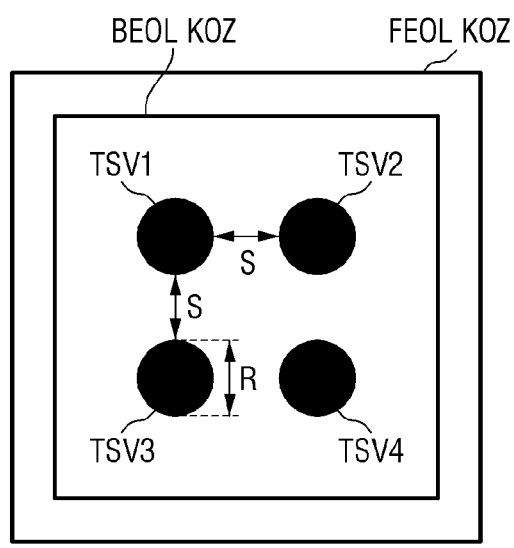
FIGS. 6A and 6B are diagrams for describing a TSV bundle according to some embodiments.
Figure 6B:
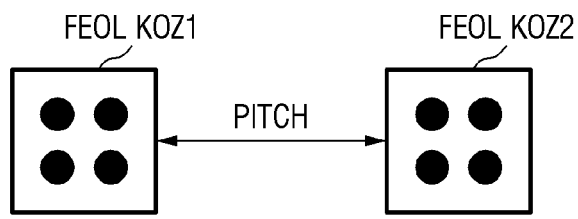

FIGS. 6A and 6B are diagrams for describing a TSV bundle according to some embodiments.

A TSV bundle region TB has at least one keep-out zone KOZ. The keep-out zone KOZ of the TSV bundle region TB is divided into a front-end-of-line (FEOL) keep-out zone FEOL KOZ and a back-end-of-line (BEOL) keep-out zone BEOL KOZ. The BEOL keep-out zone BEOL KOZ may have a smaller area than the FEOL keep-out zone FEOL KOZ. In this regard, the FEOL keep-out zone FEOL KOZ may occupy a larger area than the BEOL keep-out zone BEOL KOZ. The TSV bundle region TB includes a plurality of TSVs. A diameter of the TSVs is denoted by R and the spacing between the center points of two adjacent TSVs is denoted by S. In addition, the distance between facing borders of two adjacent FEOL keep-out zones FEOL KOZ is referred to as a pitch.

Figure 7:
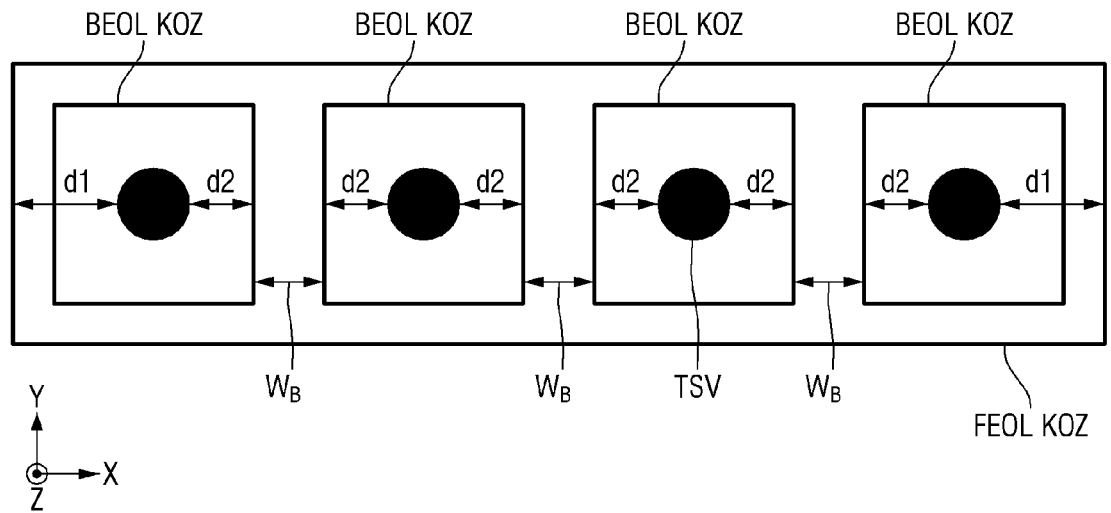
FIG. 7 is a diagram illustrating a TSV bundle region according to some embodiments.

FIG. 7 is a diagram illustrating a TSV bundle region according to some embodiments.

Referring to FIG. 7, a TSV bundle region may include one FEOL keep-out zone FEOL KOZ elongated in the second direction X and a plurality of BEOL keep-out zones BEOL KOZ formed in the FEOL keep-out zone.

A plurality of TSVs may be disposed in the FEOL keep-out zone, and the plurality of TSVs may be disposed in the plurality of BEOL keep-out zones mapped in one-to-one correspondence with the TSVs. In this regard, lower portions of the plurality of TSVs may be disposed in one FEOL keep-out zone and upper portions of the plurality of TSVs may be disposed in the individually separated BEOL keep-out zones. The individually separated BEOL keep-out zones may be spaced apart from each other at a constant distance of $W_B$ and be disposed on the FEOL keep-out zone. Each of the TSVs may be placed at a distance of d2 from the border of the BEOL keep-out zone, and may be placed at a distance of d1 from the border of the FEOL keep-out zone.

In some embodiments, a metal line ML may cross between adjacent BEOL keep-out zones BEOL KOZ1 and BEOL KOZ2. In this regard, the width of the metal line ML may be smaller than the spacing $W_B$ between the BEOL keep-out zones.

Also, a spacing S between adjacent TSVs is less than a length obtained by adding the diameter R of the TSV and the distance d2 from the TSV to the border of the BEOL keep-out zone ($S<(R+2\cdot d2)$).

Figure 8:
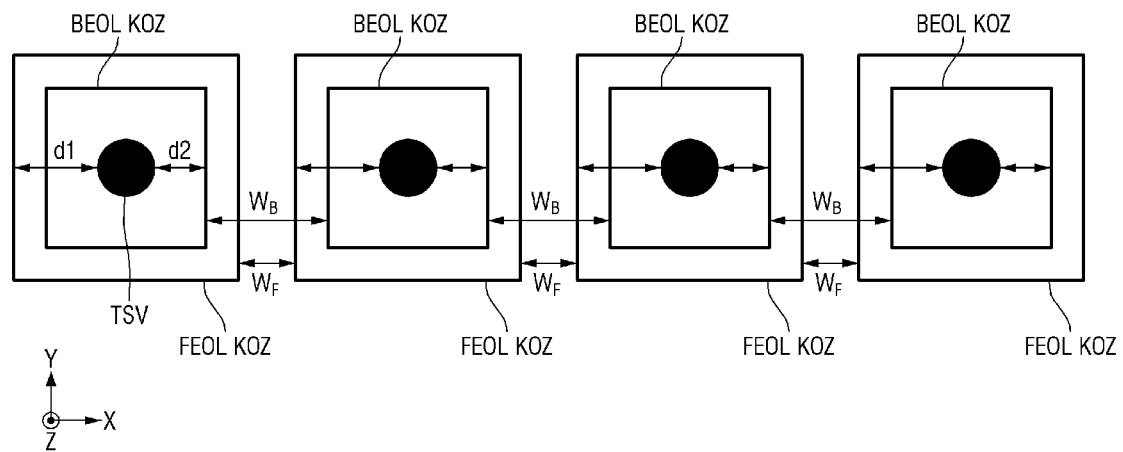
FIG. 8 is a diagram illustrating a TSV bundle region according to some embodiments.

FIG. 8 is a diagram illustrating a TSV bundle region according to some embodiments.

Referring to FIG. 8, a TSV bundle region may include one FEOL keep-out zone FEOL KOZ and one BEOL keep-out zone BEOL KOZ disposed on the FEOL keep-out zone to correspond to the FEOL keep-out zone. One BEOL keep-out zone BEOL KOZ and one FEOL keep-out zone FEOL KOZ may include one TSV.

In the illustrated example, it is assumed that one TSV, one FEOL keep-out zone FEOL KOZ, and one BEOL keep-out zone BEOL KOZ are grouped into a TSV unit bundle. In FIG. 8, the FEOL keep-out zone FEOL KOZ and the BEOL keep-out zone BEOL KOZ may each have a square shape. A TSV bundle region TB my include a plurality of TSV unit bundles spaced apart from each other by a spacing $W_F$ between FEOL keep-out zones FEOL KOZ. The spacing $W_F$ of the FEOL keep-out zone FEOL KOZ may be referred to as a pitch as described with reference to FIG. 6, and thus the TSV bundle region TB may include a plurality of TSV unit bundles spaced apart from each other by a distance equal to the pitch.

The TSV of one TSV unit bundle may be spaced apart from the borders of the FEOL keep-out zone FEOL KOZ in the first direction and the second direction by a distance of d1, and may be spaced apart from the borders of the BEOL keep-out zone BEOL KOZ in the first direction and the second direction by a distance of d2. The spacing WB between the BEOL keep-out zones BEOL KOZ may be greater than the spacing $W_F$ between the FEOL keep-out zones FEOL KOZ ($W_B>W_F$).

According to some embodiments, a metal line ML may be disposed to cross between adjacent BEOL keep-out zones BEOL KOZ. In this regard, the width of the metal line ML may be smaller than the spacing $W_B$ between the BEOL keep-out zones.

Also, a spacing S between adjacent TSVs is less than a length obtained by adding the diameter R of the TSV and the distance d2 from the TSV to the border of the BEOL keep-out zone ($S<(R+2\cdot d2)$).

Figure 9:
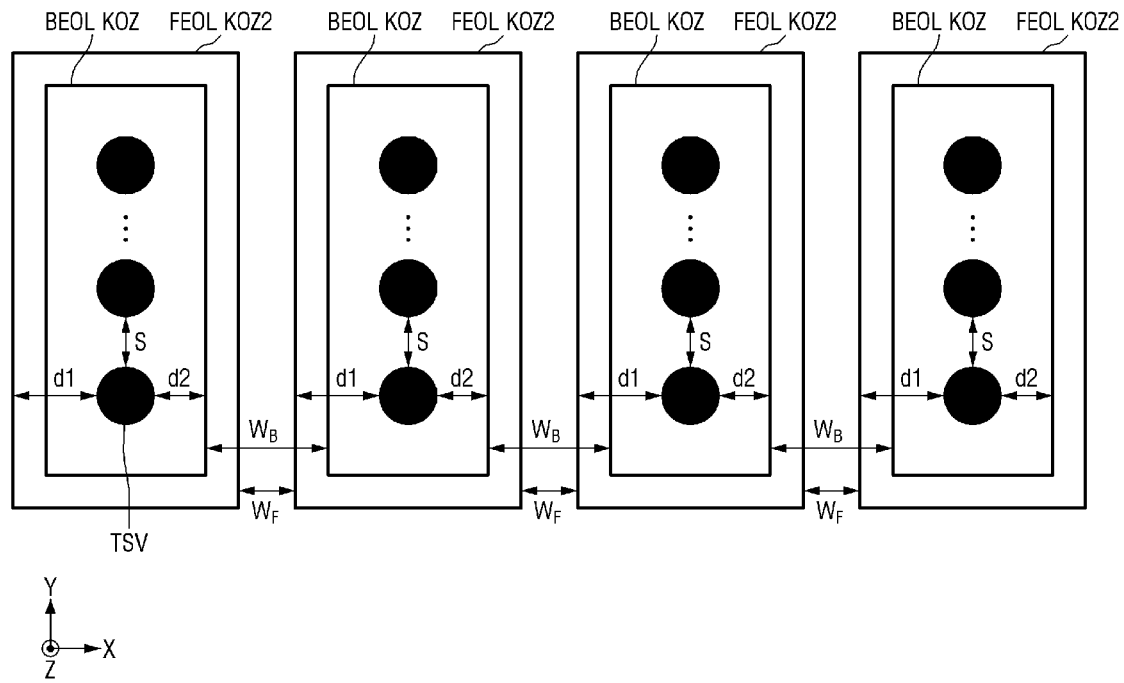
FIG. 9 is a diagram illustrating a TSV bundle region according to some embodiments.

FIG. 9 is a diagram illustrating a TSV bundle region according to some embodiments.

Referring to FIG. 9, a TSV bundle region may include one FEOL keep-out zone FEOL KOZ2 elongated in the first direction Y and one BEOL keep-out zone BEOL KOZ elongated in the first direction Y to correspond to the FEOL keep-out zone. One BEOL keep-out zone BEOL KOZ and one FEOL keep-out zone FEOL KOZ2 may include a plurality of TSVs.

In the illustrated example, it is assumed that a plurality of TSVs, one FEOL keep-out zone FEOL KOZ2, and one BEOL keep-out zone BEOL KOZ are grouped into a TSV unit bundle. In contrast to FIG. 8, in the TSV unit bundle of FIG. 9, the plurality of TSVs are spaced apart from each other by a predetermined distance S in the first direction Y, and one FEOL keep-out zone FEOL KOZ2 and one BEOL keep-out zone BEOL KOZ may each have a rectangle shape long in the first direction Y.

A TSV bundle region TB my include a plurality of TSV unit bundles spaced apart from each other by a spacing $W_F$ between FEOL keep-out zones FEOL KOZ2 in the second direction X. The spacing $W_F$ of the FEOL keep-out zone FEOL KOZ2 may be referred to as a pitch as described with reference to FIG. 6, and thus the TSV bundle region TB may include a plurality of TSV unit bundles spaced apart from each other by a distance equal to the pitch.

A TSV in one TSV unit bundle may be spaced apart from the border of the FEOL keep-out zone FEOL KOZ2 in the first direction Y by a distance of d1, and may be spaced apart from the border of the BEOL keep-out zone BEOL KOZ in the first direction Y by a distance of d2. TSVs at opposite ends among the plurality of TSVs in one TSV unit bundle may be spaced apart from the border of the FEOL keep-out zone FEOL KOZ2 in the first direction Y by a distance of d1, and may be spaced apart from the border of the BEOL keep-out zone BEOL KOZ in the first direction Y by a distance of d2.

The spacing $W_B$ between the BEOL keep-out zones BEOL KOZ may be greater than the spacing $W_F$ between the FEOL keep-out zones FEOL KOZ2 ($W_B > W_F$). According to some embodiments, a metal line ML may be disposed to cross between adjacent BEOL keep-out zones BEOL KOZ. In this regard, the width of the metal line ML may be smaller than the spacing $W_B$ between the BEOL keep-out zones.

Figure 10:
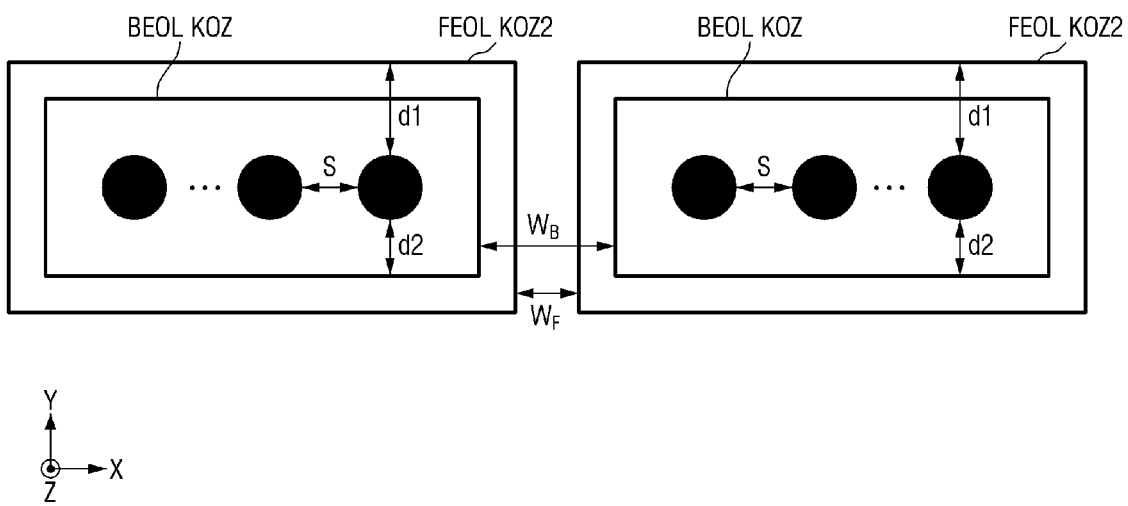
FIG. 10 is a diagram illustrating a TSV bundle region according to some embodiments.

FIG. 10 is a diagram illustrating a TSV bundle region according to some embodiments.

Referring to FIG. 10, a TSV bundle region may include one FEOL keep-out zone FEOL KOZ2 elongated in the second direction X and one BEOL keep-out zone BEOL KOZ elongated in the second direction X to correspond to the FEOL keep-out zone. One BEOL keep-out zone BEOL KOZ and one FEOL keep-out zone FEOL KOZ2 may include a plurality of TSVs.

In the illustrated example, it is assumed that a plurality of TSVs, one FEOL keep-out zone FEOL KOZ2, and one BEOL keep-out zone BEOL KOZ are grouped into a TSV unit bundle. In contrast to FIG. 9, in the TSV unit bundle of FIG. 10, the plurality of TSVs are spaced apart from each other by a predetermined distance S in the second direction X, and one FEOL keep-out zone FEOL KOZ2 and one BEOL keep-out zone BEOL KOZ may each have a rectangle shape long in the second direction X.

A TSV bundle region TB my include a plurality of TSV unit bundles spaced apart from each other by a spacing $W_F$ between FEOL keep-out zones FEOL KOZ2 in the second direction X. The spacing $W_F$ of the FEOL keep-out zone FEOL KOZ2 may be referred to as a pitch as described with reference to FIG. 6, and thus the TSV bundle region TB may include a plurality of TSV unit bundles spaced apart from each other by a distance equal to the pitch.

A TSV in one TSV unit bundle may be spaced apart from the border of the FEOL keep-out zone FEOL KOZ2 in the first direction Y by a distance of d1, and may be spaced apart from the border of the BEOL keep-out zone BEOL KOZ in the first direction Y by a distance of d2. TSVs at opposite ends among the plurality of TSVs in one TSV unit bundle may be spaced apart from the border of the FEOL keep-out zone FEOL KOZ2 in the second direction X by a distance of d1, and may be spaced apart from the border of the BEOL keep-out zone BEOL KOZ in the second direction X by a distance of d2.

The spacing $W_B$ between the BEOL keep-out zones BEOL KOZ may be greater than the spacing $W_F$ between the FEOL keep-out zones FEOL KOZ2 ($W_B > W_F$). According to some embodiments, a metal line ML may be disposed to cross between adjacent BEOL keep-out zones BEOL KOZ. In this regard, the width of the metal line ML may be smaller than the spacing $W_B$ between the BEOL keep-out zones.

Figure 11:
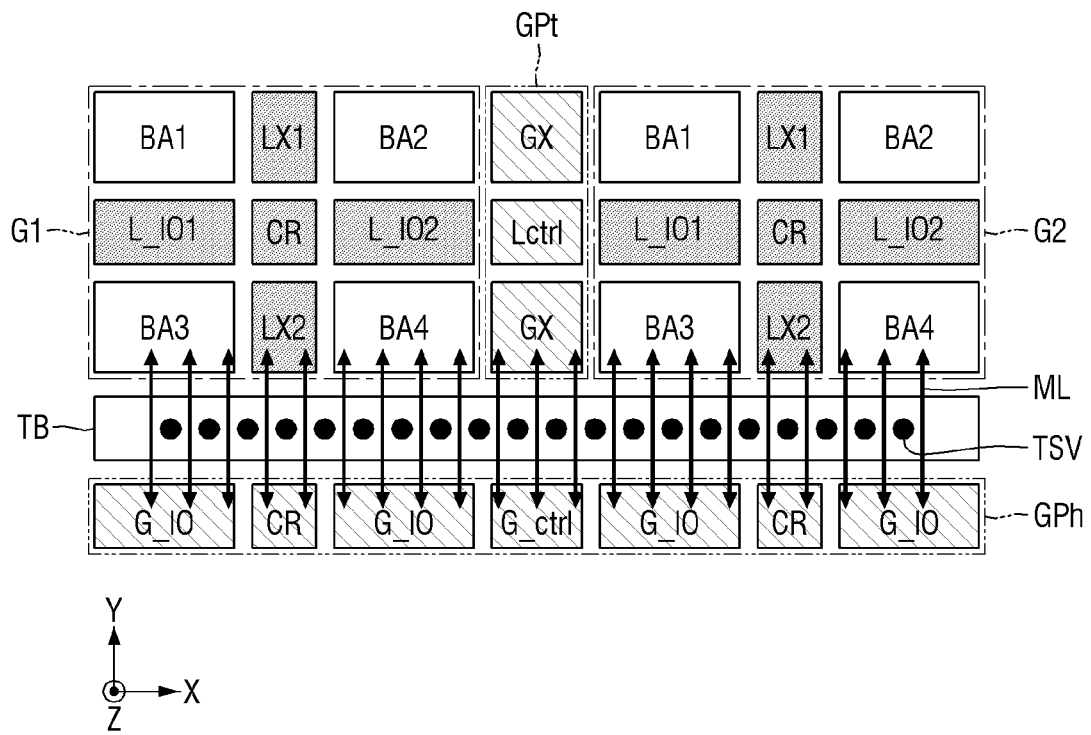
FIG. 11 is a block diagram illustrating a bit-cell array including a TSV bundle region according to some embodiments.

FIG. 11 is a block diagram illustrating a bit-cell array including a TSV bundle region according to some embodiments. Any redundant description of the bit-cell array regarding FIGS. 3 and 4 will be omitted.

Referring to FIG. 11, a bit-cell array may be implemented as a two-bank array including two banks G1 and G2. For convenience of description, a group of a first bank G1, a tail peripheral circuit region GPt, and a second bank G2 is referred to as a bank row.

In the bit-cell array implemented as a two-bank array, a TSV bundle region TB may be disposed between the head peripheral region GPh and the bank arrays. Specifically, the TSV bundle region TB may be elongated in the second direction X. The first bank G1, the tail peripheral region GPt, and the second bank G2 may be disposed on one side in the first direction Y of the TSV bundle region TB in a direction parallel to the row direction. The head peripheral region GPh elongated in the second direction may be disposed on the other side in the first direction Y of the TSV bundle region TB. In this regard, the TSV bundle region TB may be disposed between the bank row and the peripheral circuit region GPh.

In the TSV bundle region TB, TSVs, a FEOL keep-out zone, and a BEOL keep-out zone may be provided in the form described with reference to FIGS. 6A to 10, according to various embodiments.

A plurality of metal lines ML may extend in the first direction Y and cross between adjacent BEOL keep-out zones BEOL KOZ.

Figure 12:
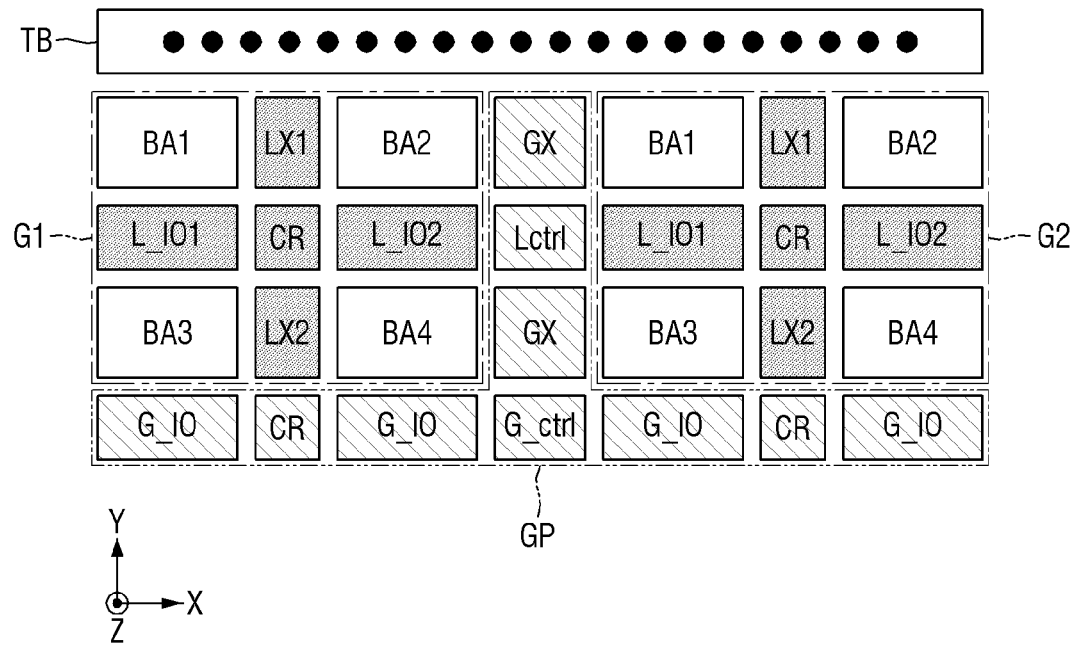
FIG. 12 is a block diagram illustrating a bit-cell array including a TSV bundle region according to some embodiments.

FIG. 12 is a block diagram illustrating a bit-cell array including a TSV bundle region according to some embodiments. Any redundant description of the bit-cell array regarding FIGS. 3 and 4 will be omitted.

Referring to FIG. 12, a bit-cell array may be implemented as a two-bank array including two banks G1 and G2.

In the bit-cell array implemented as a two-bank array, a TSV bundle region TB may be disposed on one side in the first direction Y of the bank array and a head peripheral circuit region GPh may be disposed on the other side in the first direction Y of the bank array. Unlike FIG. 11, the TSV bundle region TB of FIG. 12 may be elongated in the second direction X on outer sides of the bank array rather than between the head peripheral circuit region GPh and the bank arrays.

According to various embodiments, in the TSV bundle region TB, TSVs, a FEOL keep-out zone, and a BEOL keep-out zone may be provided in any one of the forms described with reference to FIGS. 6A to 10.

A plurality of metal lines ML may extend in the first direction Y and cross between adjacent BEOL keep-out zones BEOL KOZ.

The TSV bundle region TB is not limited to the illustrated examples of FIGS. 11 and 12 and may be disposed only on one side of the bank array in the second direction X or on both sides of the second direction X.

Figure 13:
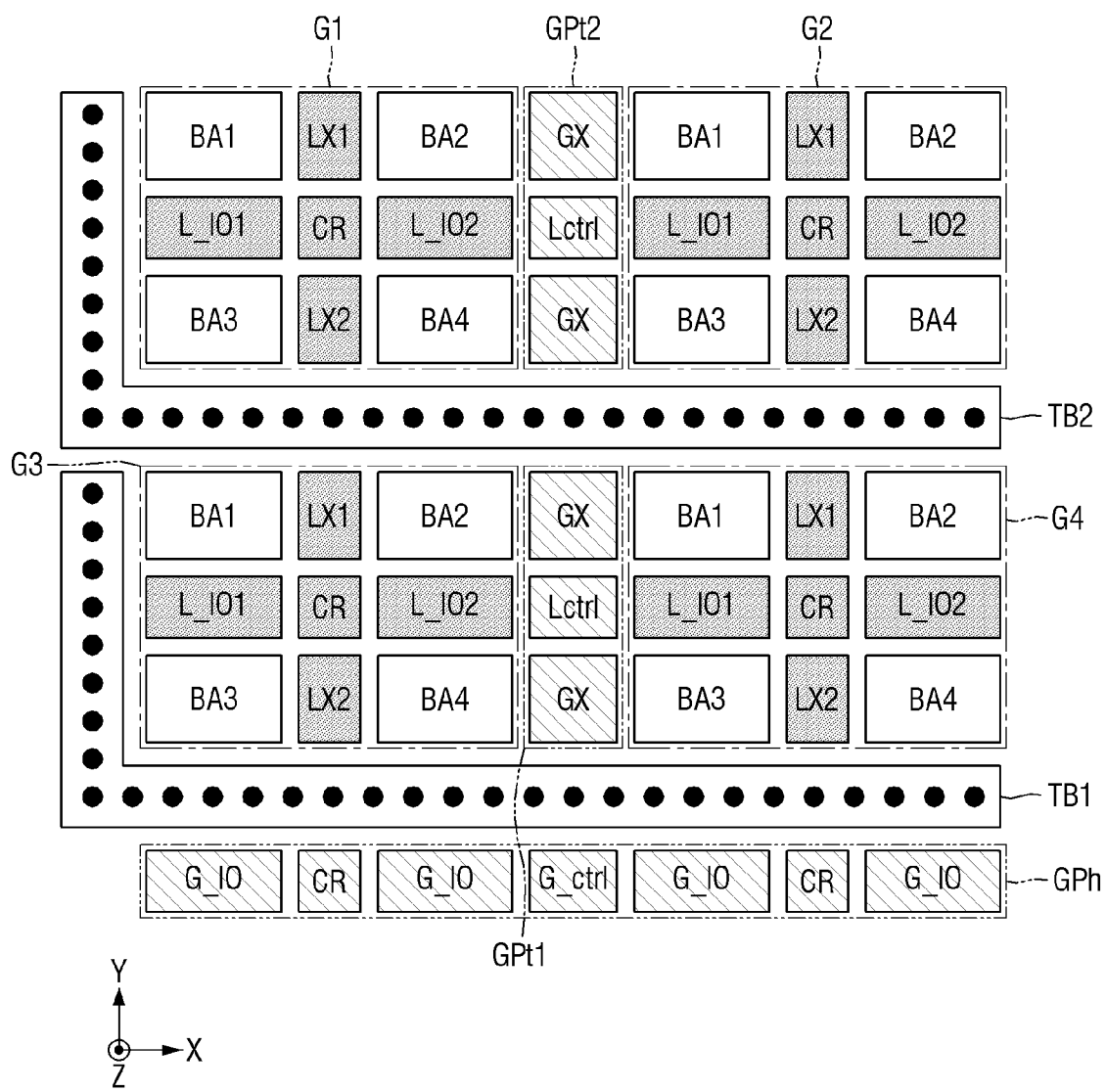
FIG. 13 is a block diagram illustrating a bit-cell array including a TSV bundle region according to some embodiments.

FIG. 13 is a block diagram illustrating a bit-cell array including a TSV bundle region according to some embodiments. Any redundant description of the bit-cell array regarding FIGS. 3 and 4 will be omitted.

Referring to FIG. 13, a bit-cell array may be implemented as a four-bank array including four banks G1, G2, G3, and G4. For convenience of description, a group of a third bank G3, a second tail peripheral circuit region GPt1, and a fourth bank G4 is referred to as a first bank row, and a group of a first bank G1, a first tail peripheral circuit region GPt2, and a second bank G2 is referred to as a second bank row. As shown in FIG. 13, a bit-cell array may include two TSV bundle regions.

In the bit-cell array implemented as a four-bank array, a first TSV bundle region TB1 may be disposed in an "L" shape surrounding one side in the first direction Y and one side in the second direction X of the first bank row G3, GPt1, and G4. A second TSV bundle region TB2 may be disposed in an "L" shape surrounding one side in the first direction Y and one side in the second direction X of the second bank row G1, GPt2, and G2.

In the illustrated example, the first TSV bundle region TB1 is disposed in an "L" shape surrounding one side in the first direction Y and one side in the second direction X of the third bank G3 and one side in the second direction X of the fourth bank G4, but embodiments are not limited to this case. The first TSV bundle region TB1 may be disposed in an inverted "L" shape. In this regard, the first TSV bundle region may be disposed in the shape that surrounds one side in the second direction X of the third bank G3 and one side in the second direction X and one side in the first direction Y of the fourth bank G4.

The second TSV bundle region TB2 is also not limited to the "L" shape of the illustrated example, and may be disposed in an inverted "L" shape surrounding one side in the second direction X of the first bank G1 and one side in the second direction X and one side in the first direction Y of the second bank G2.

According to various embodiments, in the TSV bundle region TB, TSVs, a FEOL keep-out zone, and a BEOL keep-out zone may be provided in any one of the forms described with reference to FIGS. 6A to 10.

According to some embodiments, the number of TSVs of the first TSV bundle region TB1 is equal to the number of TSVs of the second TSV bundle region. In this case, according to various embodiments, the FEOL keep-out zone and the BEOL keep-out zone of the first TSV bundle region TB1 may be implemented in the same manner as the FEOL keep-out zone and the BEOL keep-out zone of the second TSV bundle region TB2.

Alternatively, according to some embodiments, the number of TSVs of the first TSV bundle region TB1 may be different from the number of TSVs of the second TSV bundle region. In this case, according to various embodiments, the FEOL keep-out zone and the BEOL keep-out zone of the first TSV bundle region TB1 may be implemented differently from the FEOL keep-out zone and the BEOL keep-out zone of the second TSV bundle region TB2. Being implemented differently means that at least one of a pitch $W_F$ of the FEOL keep-out zone, a spacing $W_B$ of the BEOL keep-out zone, a diameter of the TSV, or the spacing S between TSVs is implemented differently between the first TSV bundle region TB1 and the second TSV bundle region TB2 when the bundle regions are implemented with the TSV unit bundles of any one of FIGS. 6A to 10.

According to some embodiments, a plurality of metal lines ML may extend in the first direction Y and cross between adjacent BEOL keep-out zones BEOL KOZ.

Figure 14:
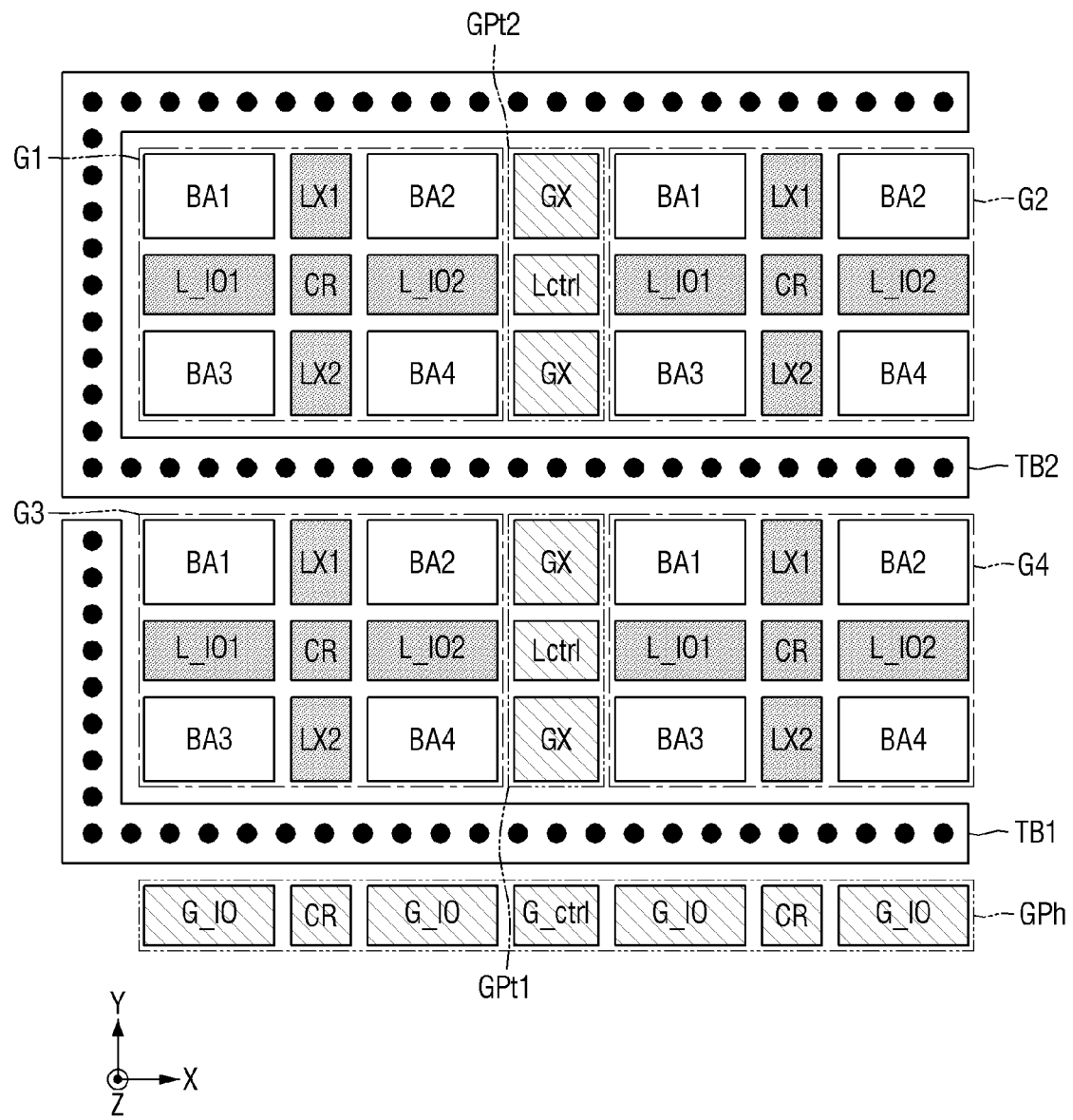
FIG. 14 is a block diagram illustrating a bit-cell array including a TSV bundle region according to some embodiments.

FIG. 14 is a block diagram illustrating a bit-cell array including a TSV bundle region according to some embodiments. Any redundant description of the bit-cell array regarding FIGS. 3, 4, and 13 will be omitted.

Referring to FIG. 14, a bit-cell array may be implemented as a four-bank array including four banks G1, G2, G3, and G4. As shown in FIG. 14, the bit-cell array may include two TSV bundle regions.

In the bit-cell array implemented as a four-bank array, a first TSV bundle region TB1 may be disposed in an "L" shape surrounding one side in the first direction Y and one side in the second direction X of the first bank row G3, GPt1, and G4. A second TSV bundle region TB2 may be disposed in a "C" shape surrounding one side in the first direction Y and one side and the other side in the second direction X of the second bank row G1, GPt2, and G2. However, embodiments are not limited to this case. The first TSV bundle region TB1 may be disposed in an inverted "L" shape and the second TSV bundle region TB2 may be disposed in a flipped "C" shape (or an open rectangular shape). In this regard, the first TSV bundle region TB1 may be disposed in an inverted "L" shape surrounding one side in the second direction X of the third bank G2 and one side in the second direction X and one side in the first direction Y of the fourth bank G4, and the second TSV bundle region TB2 may be disposed in a flipped "C" shape (or an open rectangular shape) surrounding one side in the first direction Y of the second bank G2 and one side and the other side in the second direction X of the second bank row.

According to various embodiments, in the TSV bundle region TB, TSVs, a FEOL keep-out zone, and a BEOL keep-out zone may be provided in any one of the forms described with reference to FIGS. 6A to 10.

According to some embodiments, the number of TSVs spaced apart from each other in the second direction X of the first TSV bundle region TB1 may be equal to the number of TSVs spaced apart from each other in the second direction X of the second TSV bundle region TB2.

Alternatively, according to some embodiments, the number of TSVs spaced apart from each other in the second direction X of the first TSV bundle region TB1 may be different from the number of TSVs spaced apart from each other in the second direction X of the second TSV bundle region TB2. For example, the number of TSVs spaced apart from each other in the second direction X of the first TSV bundle region TB1 may be less than the number of TSVs spaced apart from each other in the second direction X of the second TSV bundle region TB2. Also, according to some embodiments, the number of TSVs disposed in the first row of the second TSV bundle region TB2 and spaced apart from each other in the second direction X may be equal to or different from the number of TSVs disposed in the second row and spaced apart from each other in the second direction X.

According to some embodiments, the TSVs of the first TSV bundle region TB1 and the TSVs of the second TSV bundle region TB2 may be implemented in the same FEOL keep-out zones and BEOL keep-out zones.

According to some embodiments, the TSVs of the first TSV bundle region TB1 and the TSVs of the second TSV bundle region TB2 may be implemented in different FEOL keep-out zones and BEOL keep-out zones. For example, at least one of a pitch $W_F$ of the FEOL keep-out zone, a spacing $W_B$ of the BEOL keep-out zone, a diameter of the TSV, or the spacing S between TSVs may be implemented differently between the first TSV bundle region TB1 and the second TSV bundle region TB2

According to some embodiments, a plurality of metal lines ML extend in the first direction Y, and each metal line ML may be disposed to cross between BEOL keep-out zones BEOL KOZ adjacent in the second direction X in the first TSV bundle region TB1 and between BEOL keep-out zones BEOL KOZ adjacent in the second direction X in the second TSV bundle region TB2.

Figure 15:
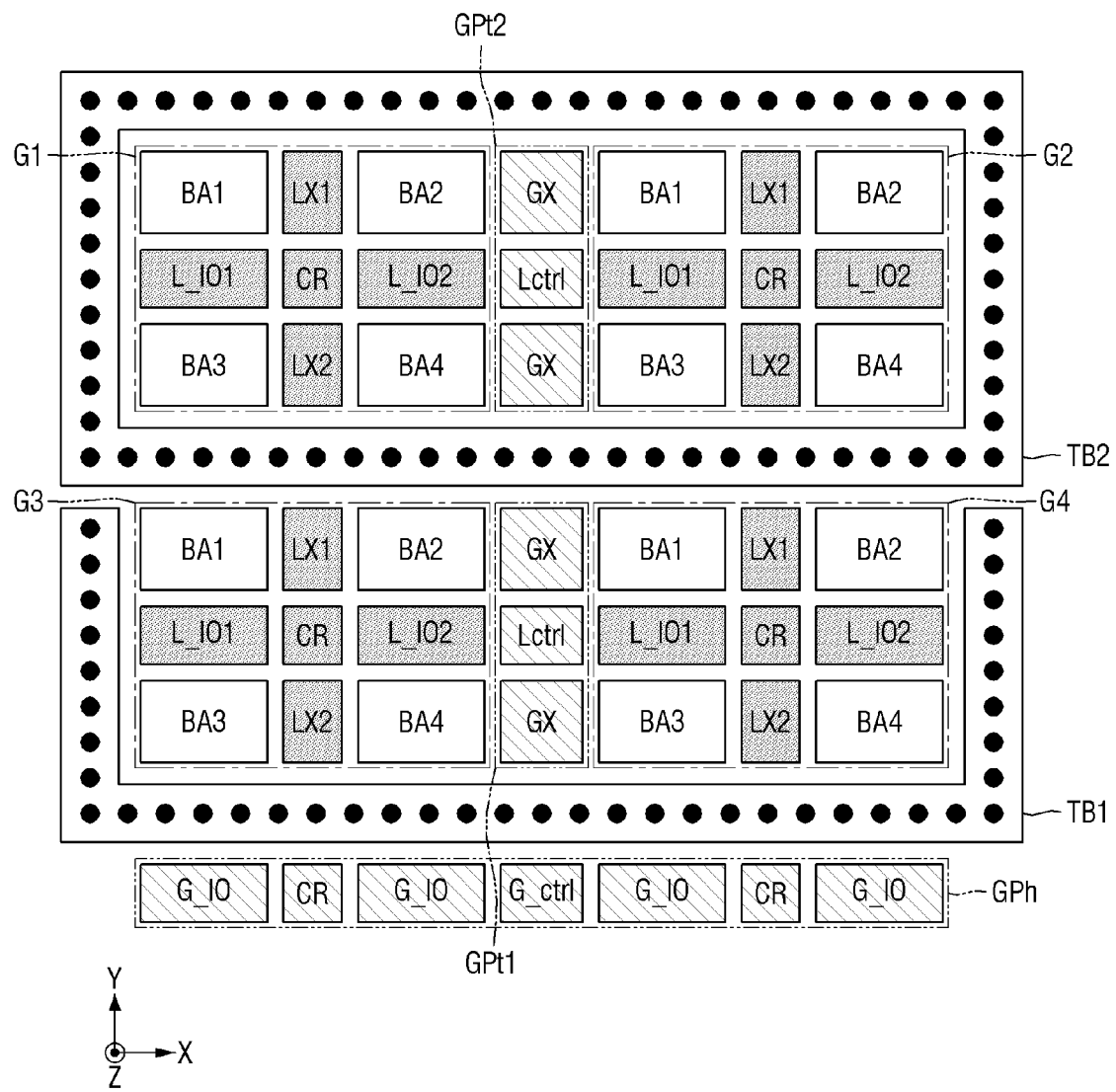
FIG. 15 is a block diagram illustrating a bit-cell array including a TSV bundle region according to some embodiments.

FIG. 15 is a block diagram illustrating a bit-cell array including a TSV bundle region according to some embodiments. Any redundant description of the bit-cell array regarding FIGS. 3, 4, and 14 will be omitted.

Referring to FIG. 15, a bit-cell array may be implemented as a four-bank array including four banks G1, G2, G3, and G4. As shown in FIG. 14, the bit cell array may include two TSV bundle regions.

As shown in FIG. 15, a first TSV bundle region TB1 may be implemented in a "C" shape (or an open rectangular shape) surrounding three sides of a first bank rows G3, GPt1, and G4, and a second TSV bundle region TB2 may be implemented in a rectangular ring shape (or a closed polygonal shape) surrounding all the outer sides of a second bank row G1, GPt2, and G2.

According to some embodiments, the number of TSVs spaced apart from each other in the second direction X of the first TSV bundle region TB1 may be equal to the number of TSVs spaced apart from each other in the second direction X of the second TSV bundle region TB2. Also, the number of TSVs disposed on one side (e.g., on a side adjacent to a first bank G1) and spaced apart from each other in the first direction Y of the second TSV bundle region may be equal to the number of TSVs disposed on the other side (e.g., on a side adjacent to a second bank G2) and spaced apart from each other in the first direction Y of the second TSV bundle region TB2.

Alternatively, according to some embodiments, the number of TSVs spaced apart from each other in the second direction X of the first TSV bundle region TB1 may be different from the number of TSVs spaced apart from each other in the second direction X of the second TSV bundle region TB2.

Figure 16:
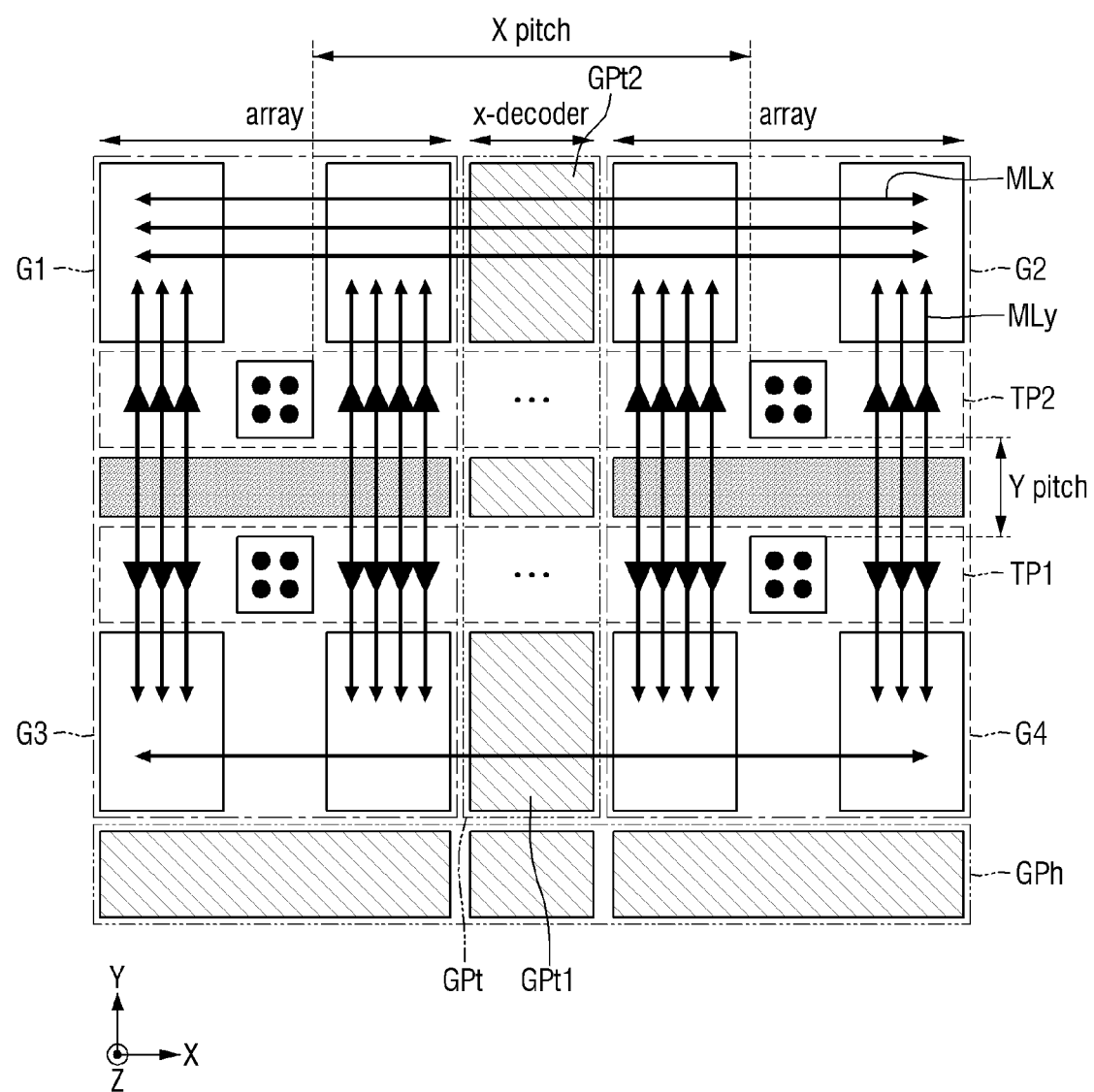
FIG. 16 is a block diagram illustrating a bit-cell array including a TSV bundle region according to some embodiments.

FIG. 16 is a block diagram illustrating a bit-cell array including a TSV bundle region according to some embodiments. Any redundant description of the bit-cell array regarding FIG. 3 will be omitted.

Referring to FIG. 16, a bit-cell array may be implemented as a four-bank array including four banks G1, G2, G3, and G4. For convenience of description, a group of a third bank G3, a second tail peripheral circuit region GPt1, and a fourth bank G4 is referred to as a first bank row, and a group of a first bank G1, a first tail peripheral circuit region GPt2, and a second bank G2 is referred to as a second bank row.

The bit-cell array may further include a dummy region between the first bank row and the second bank row. The dummy region may include TSV dummy regions TP1 and TP2, a buffer circuit region, and a pitch region.

In the illustrated example, a TSV bundle region of the first TSV dummy region and a TSV bundle region of the second TSV dummy region TP2 may have the pitch region interposed therebetween to form a predetermined spacing Y pitch. In this regard, the first TSV dummy region TP1 may be disposed on one side in the first direction Y of the pitch region and the second TSV dummy region TP2 may be disposed on the other side in the first direction Y of the pitch region. At least one peripheral circuit may be disposed in the TSV dummy regions TP1 and TP2 where the TSV bundle regions are not disposed. The peripheral circuit may include at least one of, for example, a buffer circuit, a power gating cell, or an auxiliary circuit.

The TSV bundle regions may be spaced apart from each other by a first pitch Y pitch in the first direction Y and by a second pitch X pitch in the second direction X. Here, the first pitch Y pitch may be different from the second pitch X pitch. For example, the first pitch Y pitch may be shorter than the second pitch X pitch.

According to some embodiments, each of the TSV bundle regions may be disposed in a place where the density of metal lines or the density of transistors is low. For example, each of the TSV bundle regions may be disposed in a line with a local decoder LX in the second direction Y.

Figure 17:
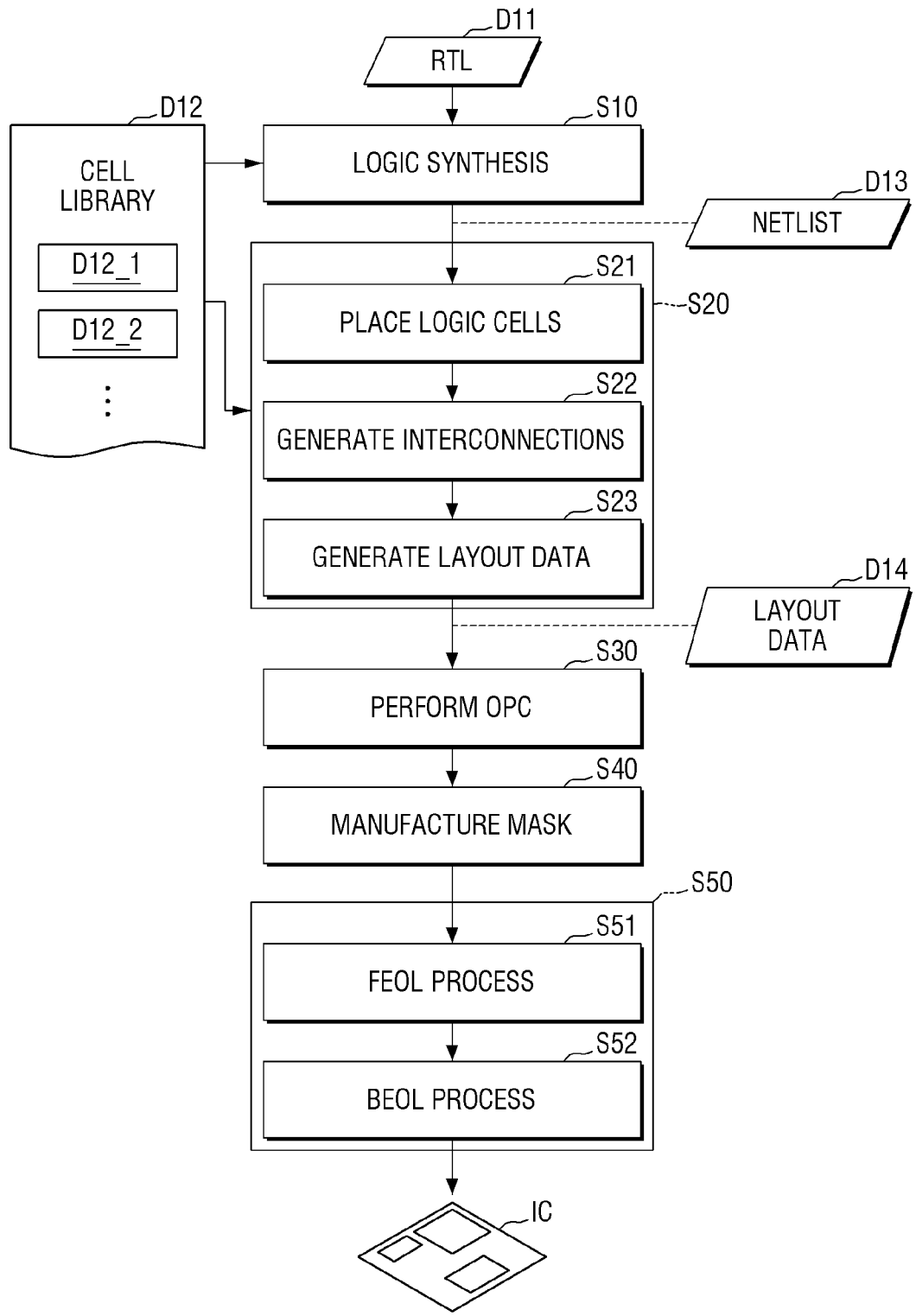
FIG. 17 is a flowchart illustrating a method for manufacturing a semiconductor integrated circuit (IC) according to some embodiments.

FIG. 17 is a flowchart illustrating a method for manufacturing a semiconductor integrated circuit (IC) according to some embodiments.

Referring to FIG. 17, a cell library D12 may include information on the SRAM of FIGS. 3 to 16. For example, the cell library D12 may include a bit-cell array, a local peripheral circuit and a global peripheral circuit of the SRAM, and functionality information, feature information, layout information, etc. of a TSV bundle. In this embodiment, a cell library D12 may include pieces of data D12_1, D12_2 that define the layout of the SRAM. The SRAM may include a plurality of logic cells, e.g., standard cells. The standard cells may have a structure that conforms to a predetermined standard.

In operation S10, a logic synthesis process may be performed to generate netlist data D13 from RTL data D11. For example, a semiconductor design tool may perform logic synthesis with reference to the cell library D12 from the RTL data made in a hardware description language (HDL) to generate the netlist data D13 including a bit stream or a netlist. The HDL may include a VHSIC hardware description language (VHDL) and Verilog. The cell library D12 may include information, such as a height of the logic cells, the number of pins included in the logic cells, the number of tracks corresponding to the logic cells, and the like. In the logic synthesis process, with reference to the information included in the cell library D12, the logic cells may be included in the integrated circuit.

In operation S20, a place & routing (P&R) operation may be performed to generate layout data D14 from the netlist data D13. The P&R operation S20 may include a plurality of operations S21, S22, and S23.

In operation S21, the logic cells may be placed. For example, a semiconductor design tool (e.g., a P&R tool) may place the plurality of logic cells with reference to the cell library D12 from the netlist data D13. For example, the semiconductor design toll may place TSV bundles between the bit-cell array and the global peripheral circuit of the SRAM.

In operation S21, power rails may be placed.

In operation S22, interconnections may be formed. An interconnection may electrically connect an output pin and an input pin of a logic cell to each other. The logic cell may include at least one via.

In operation S23, the layout data D14 may be generated. The layout data D14 may include geometric information regarding the cells and the interconnections. The layout data D14 may have a format such as graphic design system II (GDSII)

In operation S30, as an optical proximity correction (OPC) operation is performed on the layout data D74, patterns on a mask may be determined. In this regard, a pattern having an intended shape may be formed by correcting distortion such as refraction that occurs due to characteristics of light. In some embodiments, the layout of the integrated circuit may be limitedly modified in operation S30. By doing so, the structure of the integrated circuit may be optimized. Operation S30 may be referred to as a design polishing process.

In operation S40, a mask may be manufactured. At least one mask may be manufactured to form the patterns determined in operation S30. The mask may include a photomask.

In operation S50, an IC may be fabricated. For example, the IC may be fabricated by patterning a plurality of layers by using the at least one mask that is manufactured in operation S40. As shown in FIG. 17, operation S50 may include operations S51 and S52.

In operation S51, a FEOL process may be performed. The FEOL may refer to a process of forming individual devices on a substrate. The individual devices may include a transistor, a capacitor, and/or a resistor. The FEOL process may include planarizing and cleaning a wafer, forming a trench, forming a well, forming a gate line, forming a source and a drain, and the like.

In operation S52, a BEOL process may be performed. The BEOL may refer to a process of connecting individual devices. For example, the BEOL process may include siliciding a gate, a source region, and a drain region, adding a dielectric material, planarizing, forming a hole, adding a metal layer, forming a via, forming a passivation layer, and the like.

After operation S52, the IC may be packaged and used as a member of various applications.

Figure 18:
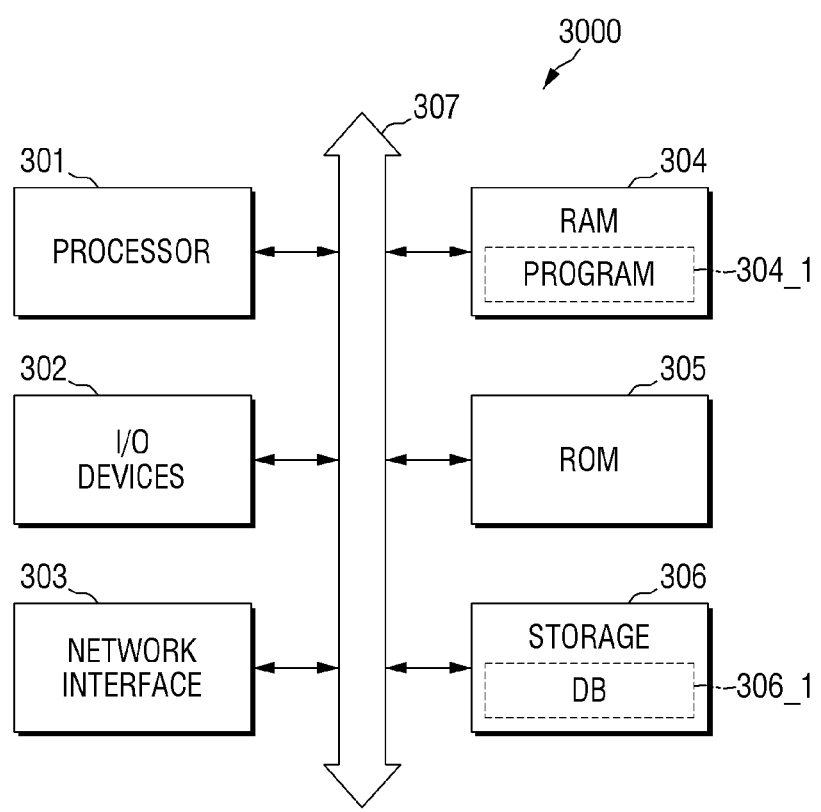
FIG. 18 is a block diagram illustrating a computing system including a memory for storing a program according to some embodiments.

FIG. 18 is a block diagram illustrating a computing system including a memory for storing a program according to some embodiments. At least a part of processes included in a method (e.g., the method described with reference to FIG. 17) for manufacturing an IC, according to embodiments, and processes included in a method (e.g., the method described with reference to FIG. 12) of designing an IC, according to some embodiments, may be performed in a computing system 3000.

The computing system 3000 may be a fixed computing system such as a desktop computer, a workstation, or a server, or a portable computing system such as a laptop computer. As shown in FIG. 18, the computing system 3000 may include a processor 301, input/output devices 302, a network interface 303, random access memory (RAM) 304, read-only memory (ROM) 305, and a storage device 306. The processor 301, the input/output devices 302, the network interface 303, the RAM 304, the ROM 305, and the storage device 306 may be connected to the bus 307 and may communicate with one another via the bus 307.

The processor 301, which may also be referred to as a processing unit, may include at least one core capable of executing an arbitrary instruction set (for example, Intel Architecture (IA)-32, 64-bit extension IA-32, x86-64, Power PC, Sparc, MIPS, ARM, IA-64, and the like), such as a micro-processor, an application processor (AP), a digital signal processor (DSP), a graphic processing unit (GPU), or the like. For example, the processor 301 may access the memory, that is, the RAM 304 or the ROM 305, via the bus 137 and may execute the instructions stored in the RAM 304 or the ROM 305.

The RAM 304 may store a program 304_1 for manufacturing an IC according to an embodiment, or may store a part of the program 304_1, and the program 304_1 may cause the processor 301 to perform at least some operations included in a method for manufacturing the IC or some operations included in a method of designing an IC. In this regard, the program 304_1 may include a plurality of instructions that may be executed by the processor 301, and the plurality of instructions included in the program 304_1 may cause the processor 131 to perform, for example, at least some operations included in the flowchart described above with reference to FIG. 17.

Data stored in the storage device 306 may not be erased when power is no longer provided thereto, such as when the computing system 3000 is out of power supply. For example, the storage device 306 may include a non-volatile memory device or a storage medium such as a magnetic tape, an optical disk, or a magnetic disk. In addition, the storage device 306 may be attachable to/detachable from the computing system 3000. The storage device 306 may also store the program 304_1 according to an embodiment, and before the program 304_1 is executed by the processor 301, the program 304_1 or at least a part thereof may be loaded from the storage device 306 to the RAM 304. Alternatively, the storage device 306 may store a file that is made by using a program language, and the program 304_1 that is generated from the file by a compiler, or the like, or at least a part of the program 304_1 may be loaded from the storage device 306 to the RAM 304. Also, the storage device 306 may store a database 306_1 that includes information required for designing the IC, for example, the standard cell library D12 shown in FIG. 17.

The storage device 306 may also store data to be processed by the processor 301 or data that has been processed by the processor 131. In this regard, the processor 301 may, according to the program 304_1, generate data by processing the data stored in the storage device 306 and store the generated data in the storage device 306. For example, the storage device 306 may store the RTL data D11, the netlist data D13, and/or the layout data D14 of FIG. 17.

The input/output devices 302 may include an input device such as a keyboard, a pointing apparatus, or the like and an output device such as a display apparatus, a printer, or the like. For example, a user may trigger the execution of the program 304_1 by the processor 301, by using the input/output devices 302, input the RTL data D11 and/or the netlist data D13 of FIG. 17, and confirm the layout data D14 of FIG. 17.

The network interface 303 may provide access to a network at outside of the computing system 3000. For example, the network may include a plurality of computing systems and communication links, and the communication links may include wired links, optical links, wireless links, or links of other arbitrary forms.

As described above, if the TSV bundle region TB is implemented in the memory device 10 according to some embodiments, it is possible to stably provide a voltage due to the arrangement of a plurality of TSVs while minimizing an increase in the area of the bit-cell array of the memory device 10.

While aspects of embodiments have been particularly shown and described, it will be understood that various changes in form and details may be made therein without departing from the spirit and scope of the following claims.

What is claimed:

1. A three-dimensional (3D) semiconductor integrated circuit comprising:

a first die comprising a circuit configured to supply a power voltage;
a second die comprising a static random access memory (SRAM) device comprising a through-silicon-via (TSV) bundle region;
a third die comprising a processor; and
a plurality of TSVs, each of which is provided on the TSV bundle region and extends from the TSV bundle region to the third die,
wherein the SRAM device comprises:
  a bank array comprising a plurality of banks, each of which comprises a plurality of sub-bit-cell arrays and a local peripheral circuit region arranged in a cross (+) shape between the plurality of sub-bit-cell arrays; and
  a global peripheral circuit region comprising a tail peripheral circuit region extending in a first direction and a head peripheral circuit region extending in a second direction, the tail peripheral circuit region and the head peripheral circuit region being arranged in a "T" shape.

2. The 3D semiconductor integrated circuit of claim 1, wherein the TSV bundle region extends in the second direction between a first bank row and a second bank row of the bank array, and
wherein each of the first bank row and the second bank row comprises a first bank and a second bank separated by the tail peripheral circuit region.

3. The 3D semiconductor integrated circuit of claim 1, wherein the TSV bundle region comprises:
  at least one front-end-of-line (FEOL) keep-out zone;
  a plurality of BEOL keep-out zones disposed on the FEOL keep-out zone and disposed at intervals of a first spacing in the second direction; and
  TSVs disposed, respectively, in the plurality of BEOL keep-out zones.

4. The 3D semiconductor integrated circuit of claim 1, wherein the TSV bundle region comprises a plurality of TSV bundles, each of which comprises one FEOL keep-out zone, one BEOL keep-out zone that corresponds to the FEOL keep-out zone, and a TSV, and
wherein a spacing between adjacent FEOL keep-out zones is less than a spacing between BEOL keep-out zones, and a metal line is disposed to cross between adjacent BEOL keep-out zones.

5. The 3D semiconductor integrated circuit of claim 4, wherein each of the TSV bundles comprises one FEOL keep-out zone, one BEOL keep-out zone that corresponds to the FEOL keep-out zone, and a plurality of TSVs.

6. A static random access memory (SRAM) device comprising:
  a bank array comprising a plurality of banks, each of which comprises a plurality of sub-bit-cell arrays and a local peripheral circuit region arranged in a cross (+) shape between the plurality of sub-bit-cell arrays;
  a global peripheral circuit comprising a global decoder circuit extending in a first direction between the plurality of banks, and a global input/output circuit extending in a second direction on one side of the bank array;
  a plurality of through-silicon-vias (TSVs) arranged in a line; and
  a plurality of metal lines extending in the first direction to connect the global input/output circuit to a local input/output circuit of the local peripheral circuit region,
  wherein the plurality of metal lines are disposed to cross between back-end-of-line (BEOL) keep-out zones of two adjacent TSVs among the plurality of TSVs.

7. The SRAM device of claim 6, wherein the plurality of TSVs are configured to supply a power voltage from a lower die below the SRAM device to an upper die above the SRAM device.

8. The SRAM device of claim 6, wherein the TSV bundle region comprises a plurality of TSV bundles, each of which comprises one front-end-of-line (FEOL) keep-out zone, one BEOL keep-out zone that corresponds to the FEOL keep-out zone, and a TSV, and
wherein a first spacing between adjacent FEOL keep-out zones is less than a second spacing between the BEOL keep-out zones.

9. The SRAM device of claim 8, wherein each of the TSV bundles comprises one FEOL keep-out zone, one BEOL keep-out zone that corresponds to the FEOL keep-out zone, and a plurality of TSVs.

10. The SRAM device of claim 9, wherein each of the TSV bundles comprises the FEOL keep-out zone and the BEOL keep-out zone that extend in the first direction, and
wherein the plurality of TSVs are disposed at predetermined intervals in the first direction, the predetermined intervals being greater than the second spacing.

11. The SRAM device of claim 9, wherein each of the TSV bundles comprises the FEOL keep-out zone and the BEOL keep-out zone that extend in the second direction, the plurality of TSVs are disposed at predetermined intervals in the second direction, and the predetermined intervals being greater than the second spacing.

12. The SRAM device of claim 6, wherein the bank array comprises a first bank row and a second bank row,
wherein the first bank row extends in the second direction and comprises a first bank, the global decoder circuit, and a second bank,
wherein the second bank row comprises a third bank, the global decoder circuit, and a fourth bank, and
wherein the TSV bundle region extends in the second direction and faces one side of the first bank row and one side in the second direction of the second bank row.

13. The SRAM device of claim 6, wherein the TSV bundle region extends in the second direction on one side of the bank array.

14. The SRAM device of claim 6, wherein the bank array comprises a first bank row and a second bank row, and
wherein the TSV bundle region comprises a first TSV bundle region arranged in an "L" shape along two sides of the first bank row, and a second TSV bundle region arranged in an "L" shape along a side of the second bank row.

15. The SRAM device of claim 6, wherein the bank array comprises a first bank row and a second bank row, and
wherein the TSV bundle region comprises:
  a first TSV bundle region arranged in an "L" shape, facing two sides of the first bank row; and
  a second TSV bundle region arranged in an open rectangular shape, facing three sides of the second bank row.

16. The SRAM device of claim 6, wherein the bank array comprises a first bank row and a second bank row, and
wherein the TSV bundle region comprises:
  a first TSV bundle region arranged in an open rectangular shape, facing three sides of the first bank row; and
  a second TSV bundle region arranged in a closed rectangular shape that surrounds the second bank row.

17. A static random access memory (SRAM) device comprising:

a bank array comprising a plurality of banks, each of which comprises a plurality of sub-bit-cell arrays and a local peripheral circuit region configured to access the plurality of sub-bit-cell arrays;

a global peripheral circuit comprising a global decoder extending in a first direction between the plurality of banks and a global input/output circuit that extends in a second direction on one side of the bank array;

a plurality of through-silicon-vias (TSVs) provided in a TSV bundle region and configured to supply a power voltage to another die;

a plurality of back-end-of-line (BEOL) keep-out zones surrounding the TSVs and facing a first side of the bank array; and a plurality of metal lines extending in the first direction to electrically connect the global input/output circuit to a local input/output circuit of the local peripheral circuit region, wherein the metal lines cross between adjacent BEOL keep-out zones.

18. The SRAM device of claim 17, wherein the TSV bundle region comprises a plurality of BEOL keep-out zones, one front-end-of-line (FEOL) keep-out zone that corresponds to each of the plurality of BEOL keep-out zones, and the plurality of TSVs, and wherein at least one of the plurality of TSVs is provided in each of the plurality of BEOL keep-out zones.

19. The SRAM device of claim 17, wherein the TSV bundle region comprises one FEOL keep-out zone, one BEOL keep-out zone that corresponds to the FEOL keep-out zone, and a TSV, and wherein a first spacing between the FEOL keep-out zones is less than a second spacing between the BEOL keep-out zones.

20. The SRAM device of claim 19, wherein a spacing between adjacent TSVs is less than a value obtained by adding a diameter of the TSV and a distance from the TSV to a border of the BEOL keep-out zone.

\* \* \* \* \*